(12) United States Patent
Watanabe

(10) Patent No.: US 6,304,571 B1
(45) Date of Patent: Oct. 16, 2001

(54) MULTIPROCESSOR TYPE EXCHANGE AND COMMUNICATION METHOD THEREFOR

(75) Inventor: Yoshihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/037,936

(22) Filed: Mar. 10, 1998

(30) Foreign Application Priority Data

Oct. 6, 1997 (JP) .................................................... 9-272777

(51) Int. Cl.[7] .......................................................... H04J 3/02
(52) U.S. Cl. ............................................ 370/398; 370/535
(58) Field of Search .................................. 370/410, 419, 370/420, 422, 426, 522, 528, 395, 398, 535

(56) References Cited

U.S. PATENT DOCUMENTS 5,663,959 * 9/1997 Nakagawa ............................ 370/528

FOREIGN PATENT DOCUMENTS

| 2123850 | 5/1990 | (JP) . |
| 7177155 | 7/1995 | (JP) . |
| 9162890 | 6/1997 | (JP) . |

* cited by examiner

*Primary Examiner*—Huy D. Vu
(74) *Attorney, Agent, or Firm*—Helfgott & Karas, P C

(57) ABSTRACT

A multiprocessor type exchange having a switching apparatus and a plurality of line apparatuses each containing a processor. This multiprocessor type exchange introduces a control information cell and, at the same time, has a cell demultiplexing unit in each line apparatus for discriminating whether each cell which is input is a user cell or the control information cell and separating the same. Each processor is constituted so as to perform communication with other processors via the switching apparatus by using the separated control information cell. By such a structure, a high speed bus, call processing processor, etc. of the related art are eliminated, parallel access is made possible, and, at the same time, system expansion is facilitated.

11 Claims, 24 Drawing Sheets

TAG: HW NUMBER OF OPPOSING PROCESSOR

B1: BROADCAST IS TO BE PERFORMED OR NOT
B2: PERFECT BROADCAST IS TO BE PERFORMED OR NOT

MULTIPROCESSOR TYPE EXCHANGE AND COMMUNICATION METHOD THEREFOR

BACKGROUND OF THE INVENTION

1. Field of the Invention

The present invention relates to a multiprocessor type exchange, for example, a multiprocessor type asynchronous transfer mode (ATM) exchange.

An exchange is generally constituted provided with a switching apparatus for performing an exchange of cells such as ATM cells communicated among a plurality of pieces of terminal equipment and line apparatuses inserted between this switching apparatus and each of the plurality of pieces of terminal equipment. When a processor is contained in each of these line apparatuses, the exchange is commonly referred to as a "multiprocessor type exchange".

2. Description of the Related Art

As will be explained in further detail later, the multiprocessor type exchange of the related art is configured by a single call processing processor at the center and a plurality of processors which are closely coupled via a high speed bus. Such a multiprocessor configuration has the following disadvantages.

(i) Parallel access with respect to a plurality of processors cannot be carried out.

(ii) When accesses with respect to a plurality of processors simultaneously occur, the access to one processor starts after the access to another processor is finished, therefore time for useless waiting is unavoidable for the former processor.

(iii) When expanding the scale of the ATM exchange, the length of the high speed bus must be extended along with this. The resultant operational delay time therefore can no longer be ignored.

The above disadvantageous points (i), (ii), and (iii) are inherently predictable. However, if the line speed required for one line apparatus reaches 600 Mbps due to the increase in the scale of multimedia communication in recent years, the above disadvantageous points (i), (ii), and (iii) will actually become serious problems. Therefore, a large scale and high speed multiprocessor type ATM exchange will not be able to be realized.

Therefore, in the past, a procedure for transferring communication information among multiprocessors by using cells transferred in a mode of in-channel in an ATM speech path was proposed (Japanese Unexamined Patent Publication (Kokai) No. 2-123850).

Further, based on the above proposal (Japanese Unexamined Patent Publication (Kokai) No. 2-123850), as an example, an improvement of the multiprocessor type exchange of the related art was proposed (Japanese Unexamined Patent Publication (Kokai) No. 7-177155). According to this proposal, inter-multiprocessor communication for data communication among processors is realized by providing an ATM cell assemble/disassemble apparatus in front of each processor constituting the multiprocessor and, at the same time, providing an ATM cell signal inserting/separating apparatus for demultiplexing or multiplexing ATM cells on the line, transforming the transfer data to be communicated among processors to ATM cells, and carrying out the switching of ATM cells at a speech path side ATM switch.

While the proposal of the above related art realizes inter-processor communication among processors by using ATM cells, in actuality, in a multiprocessor type exchange, it is necessary to simultaneously execute not only the communication among processors mentioned above, but also the inherent communication of information among subscribers by using the ATM cells. That is, a communication means for simultaneously establishing inter-processor communication and inter-subscriber communication is necessary. In addition, there is a problem that this communication means must be realized by extremely simple hardware and control.

SUMMARY OF THE INVENTION

Accordingly, in consideration with the above situation, an object of the present invention is to provide a multiprocessor type ATM exchange capable of realizing inter-processor communication and inter-subscriber communication by extremely simple hardware and control.

To attain the above object, the present invention introduces control information cells and, at the same time, provides in each line apparatus a cell demultiplexing unit for discriminating whether each cell being input is user cell or control information cell and separating the same. Each processor performs the communication with other processors via a switching apparatus using each separated control information cell. According to the present invention, therefore, a multiprocessor type exchange is provided which has a switching apparatus and a plurality of line apparatuses each containing a processor wherein it is possible to eliminate the conventional high speed bus and call processing processor etc. and thereby make parallel access possible and, at the same time, facilitate system expansion.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 25:
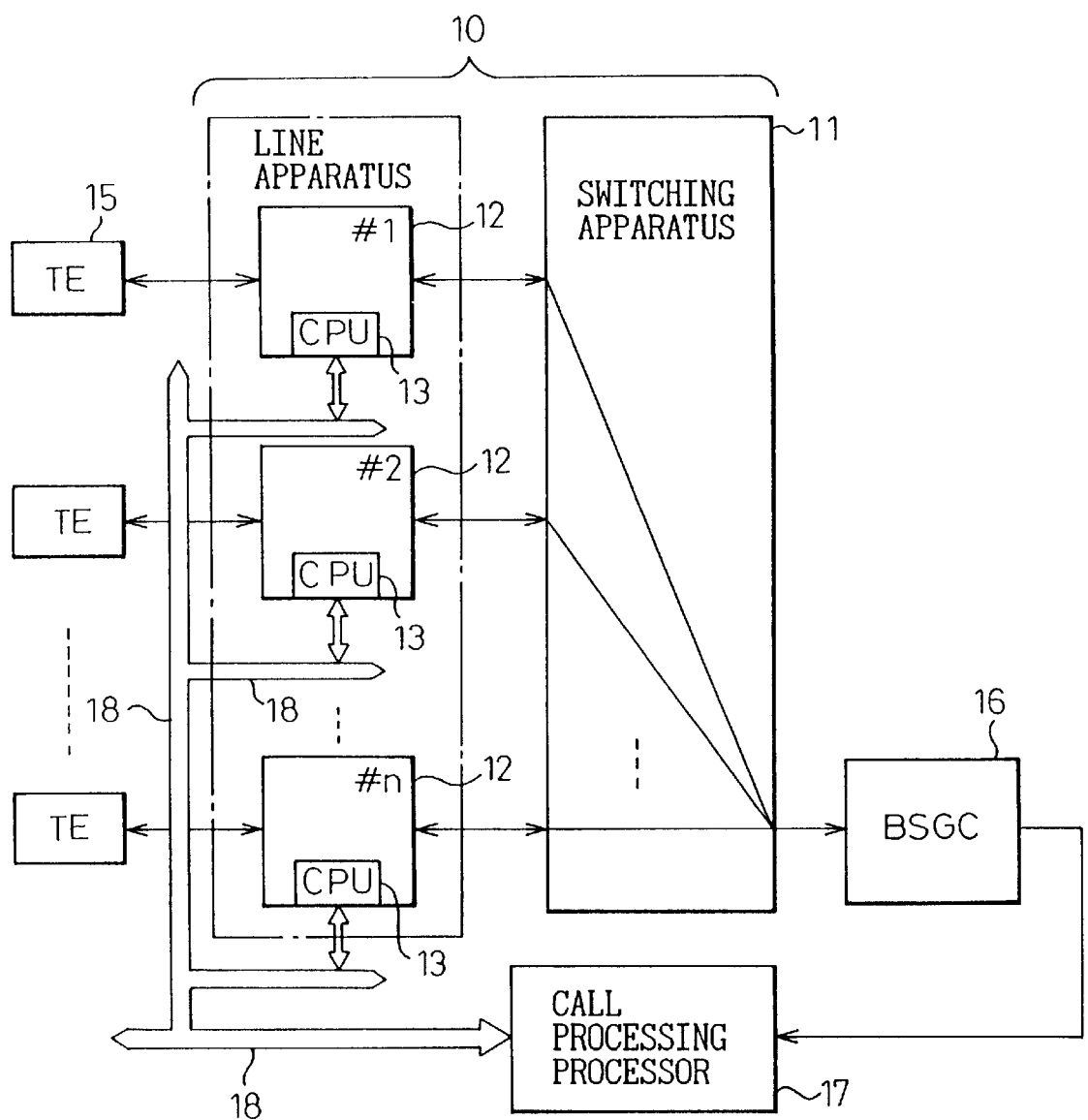
FIG. 25 is a view of an example of a multiprocessor type exchange of the related art.

FIG. 25 is a view of an example of a multiprocessor type exchange of the related art. Note that this exchange is an ATM exchange. In the figure, 10 denotes the ATM exchange which mainly comprises a switching apparatus 11 and a plurality of line apparatuses 12. One line apparatus 12 is provided for every piece of terminal equipment (TE) 15 and is generally referred to as a line corresponding part or individual part. This will be referred to as a line apparatus in the present invention.

Note that not all of the line apparatuses 12 are always connected to the terminal equipment 15. In actuality, one of these line apparatuses 12 may be sometimes connected to an adjacent office. Further, the terminal equipment 15 is drawn in the figure as if it were a single apparatus, but in actuality, this is sometimes a PBX or small scale LAN. Namely, the "terminal equipment" referred to in the present invention is a generic term of a group of equipment on the terminal side, but is represented by one block for simplification. Accordingly, a line speed between the terminal equipment 15 and the corresponding line apparatus 12 sometimes reaches 150 Mbps, further 600 Mbps.

In this figure, it is the processors (CPU) 13 contained in each of the line apparatuses 12 that are particularly relevant to the present invention. These processors 13 are connected via a common high speed bus 18 to form a multiprocessor. As a whole, they constitute the multiprocessor type ATM exchange 10.

Explaining this in further detail, a call processing processor 17 is connected to the high speed bus 18. This call processing processor 17 cooperates with a broadband signalling controller (BSGC) apparatus 16. The BSGC apparatus 16 is connected to the switching apparatus 11.

Message signals such as SETUP (call set-up) for every subscriber generated from the terminal equipment 15 are terminated at the BSGC apparatus 16. The messages are further transferred to the call processing processor 17, which instructs the required call processing to the corresponding processor 13 via the high speed bus 18. In this case, the call processing processor 17 analyzes, from these messages, the call origination and termination and performs processing such as selection of a routing path of the ATM cells in the switching apparatus 11.

The information of the selected routing path is stored in a routing table in a corresponding line apparatus 12 (for example a VCC table) and becomes the tag information of the user cell transferred by the above SETUP.

As explained above, the multiprocessor type exchange of the related art is configured by a single call processing processor 17 at the center and a plurality of processors 13 which are closely coupled via a high speed bus 18. Such a multiprocessor configuration has the following disadvantages as explained above:

(i) Parallel access with respect to a plurality of processors 13 cannot be carried out.

(ii) When accesses with respect to a plurality of processors 13 simultaneously occur, the access to one processor starts after the access to another processor is finished, therefore time for useless waiting is unavoidable for the former processor.

(iii) When expanding the scale of the ATM exchange, the length of the high speed bus 18 must be extended along with this. The resultant operational delay time therefore can no longer be ignored.

The above disadvantageous points (i), (ii), and (iii) are inherently predictable. However, if the line speed required for one line apparatus reaches 600 Mbps as mentioned before, due to the increase in the scale of multimedia communication in recent years, the above disadvantageous points (i), (ii), and (iii) will actually become serious problems. Therefore, a large scale and high speed multiprocessor type ATM exchange will not be able to be realized.

Therefore, as explained above, in the past, a procedure for transferring communication information among multiprocessors by using cells transferred in a mode of in-channel in an ATM speech path was proposed (Japanese Unexamined Patent Publication (Kokai) No. 2-123850).

Further, based on the above proposal (Japanese Unexamined Patent Publication (Kokai) No. 2-123850), as an example, an improvement of the multiprocessor type exchange of the related art shown in FIG. 25 was proposed (Japanese Unexamined Patent Publication (Kokai) No. 7-177155). According to this proposal, inter-multiprocessor communication for data communication among processors is realized by providing an ATM cell assemble/disassemble apparatus in front of each processor constituting the multiprocessor and, at the same time, providing an ATM cell signal inserting/separating apparatus for demultiplexing or multiplexing ATM cells on the line, transforming the transfer data to be communicated among processors to ATM cells, and carrying out the switching of ATM cells at a speech path side ATM switch.

As already explained, while the proposal of the above related art realizes inter-processor communication among processors by using ATM cells, in actuality, in a multiprocessor type exchange, it is necessary to simultaneously execute not only the communication among processors mentioned above, but also the inherent communication of information among subscribers by using the ATM cells. That is, a communication means for simultaneously establishing inter-processor communication and inter-subscriber communication is necessary. In addition, there is the already mentioned problem that this communication means must be realized by extremely simple hardware and control.

In consideration with the above situation, the present invention provides a multiprocessor type ATM exchange capable of realizing inter-processor communication and inter-subscriber communication by extremely simple hardware and control. This will be explained in detail below.

Figure 1:
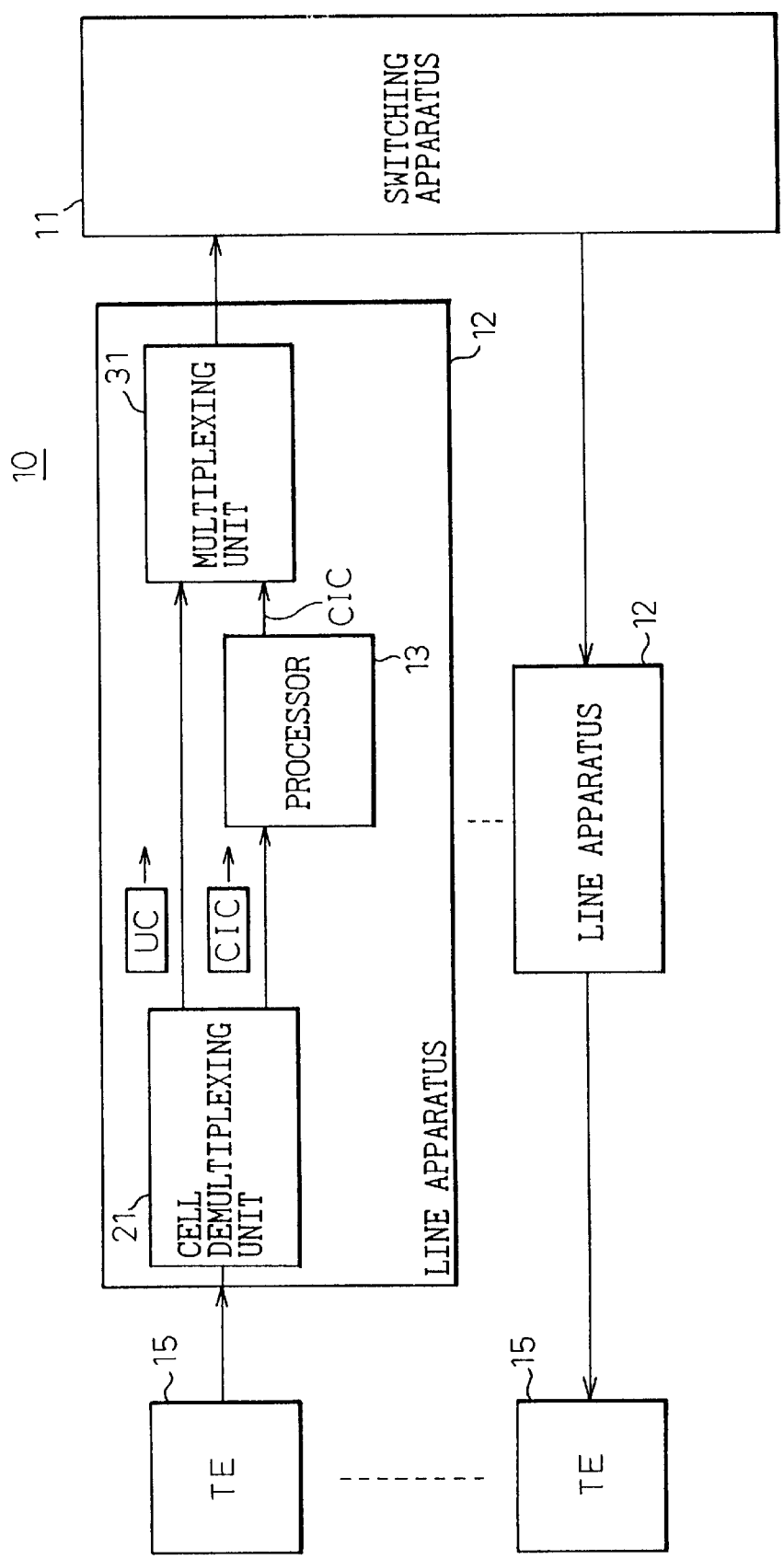
FIG. 1 is a view of the basic configuration of a multiprocessor type exchange according to the present invention.

FIG. 1 is a view of the basic configuration of a multiprocessor type exchange according to the present invention. As an example, a case of a multiprocessor type ATM exchange will be shown.

First, the multiprocessor type ATM exchange 10 on which the present invention is based is a multiprocessor type ATM exchange provided with a switching apparatus 11 for performing the switching of ATM cells communicated among a plurality of pieces of terminal equipment 15 and with line apparatuses 12 inserted between the switching apparatus 11 and each of the plurality of pieces of terminal equipment 15 and a processor 13 is contained in each line apparatus 12 in the same way as that shown in FIG. 25.

In such a multiprocessor type ATM exchange 10, the feature characterizing the present invention resides in the cell demultiplexing unit 21. Namely, a cell demultiplexing unit 21 for discriminating whether cells to be input to each line apparatus 12 are user cells UC or control information cells CIC and separating the same is provided in each line apparatus 12. Each processor 13 performs communication with other processors via the switching apparatus 11 by using the control information cells CIC separated by the cell demultiplexing unit 21. Here, a user cell UC is a usual ATM cell in the ATM exchange, but the control information cell CIC is a special ATM cell newly introduced for inter-processor communication by the present invention.

The point of the present invention resides in the use of the properties of an ATM exchange for communication of control information cells CIC by inter-processor communication via the switching apparatus 11 so as to thereby eliminate the conventional call processing processor 17 and BSGC apparatus 16 from the ATM exchange and replacing the eliminated functions by decentralized processing by the plurality of processors 13.

Figure 2:
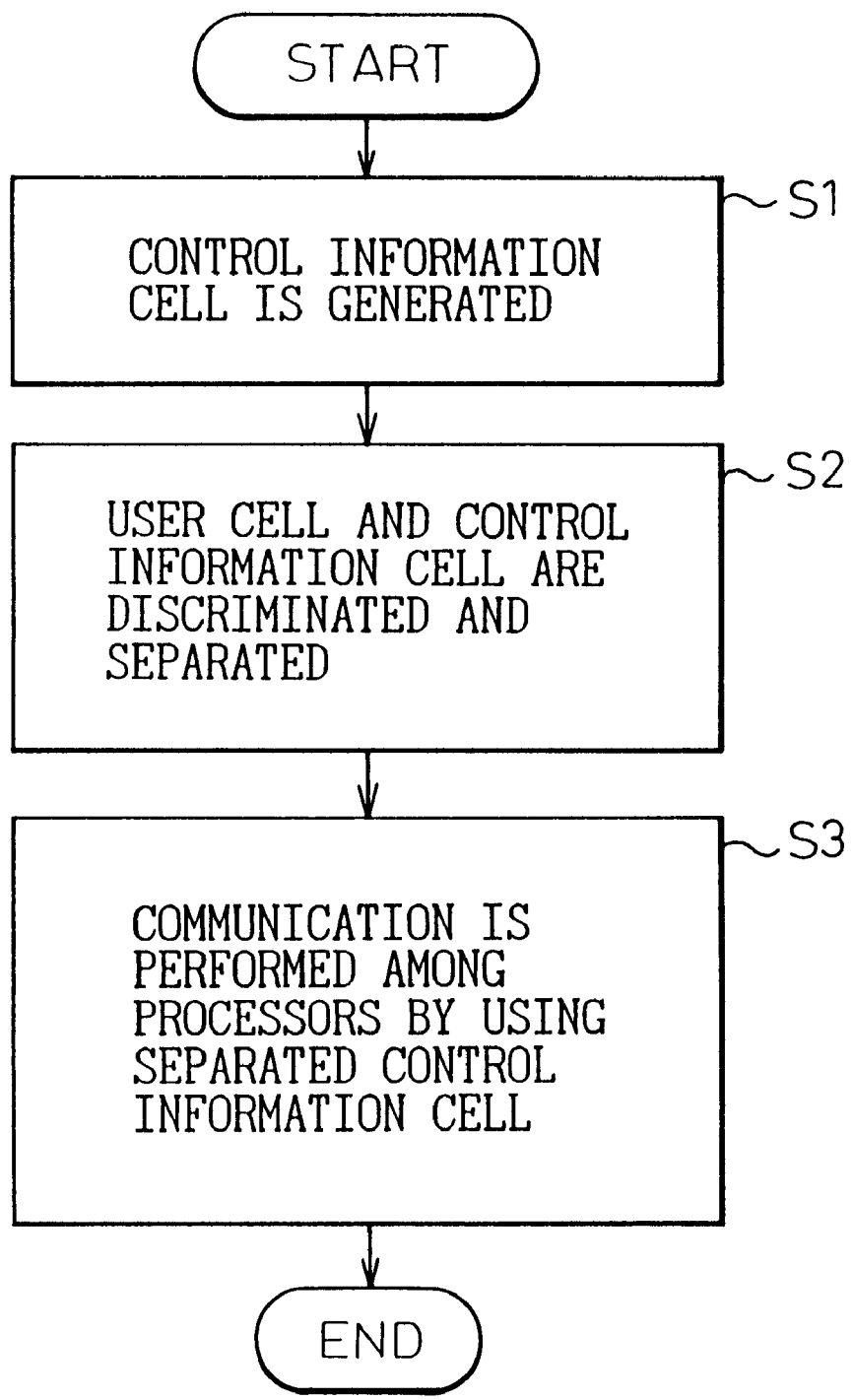
FIG. 2 is a flowchart of the method of communication in a multiprocessor type exchange according to the present invention.

FIG. 2 is a flowchart of the method of communication in a multiprocessor type exchange according to the present invention. The operation of each step in the figure is as follows.

In the multiprocessor type ATM exchange 10 which is provided with a switching apparatus 11 for performing the switching of ATM cells communicated among a plurality of pieces of terminal equipment 15 and with line apparatuses 12 inserted between the switching apparatus 11 and each of the plurality of pieces of terminal equipment 15, wherein each line apparatus 12 contains a processor 13, Step S1: Generates the control information cells CIC as well as the user cells UC to be communicated among the plurality of pieces of terminal equipment 15;

Step S2: Discriminates whether the ATM cells input to each line apparatus 12 are user cells UC or control information cells CIC and separates the same; and Step S3: Performs communication among processors 13 via the switching apparatus 11 by using the separated control information cells CIC.

Figure 3:
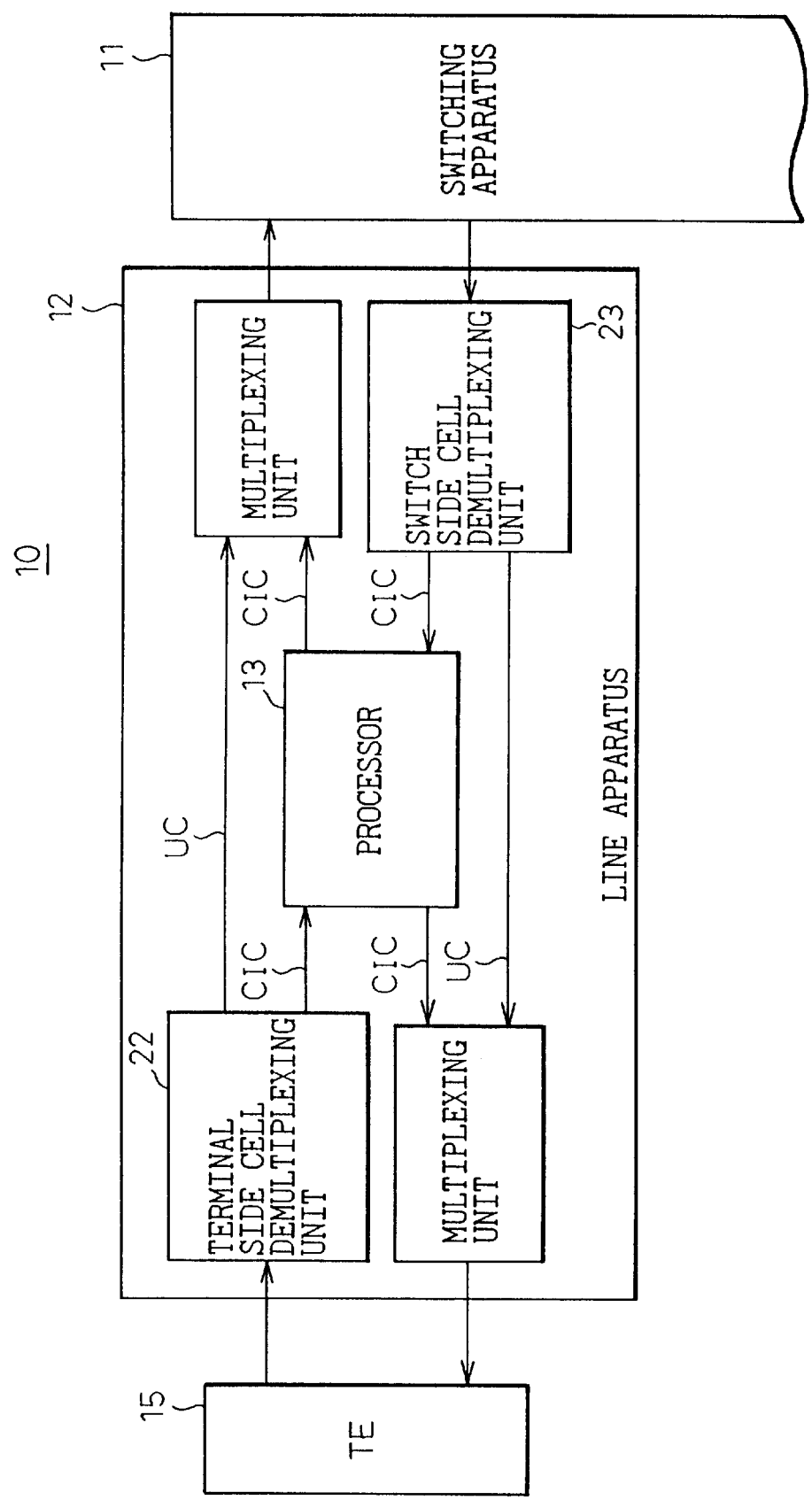
FIG. 3 is a view of an actual example of a cell demultiplexing unit 21 shown in FIG. 1.

FIG. 3 is a view of an actual example of a cell demultiplexing unit shown in FIG. 1.

As shown in the figure, the "cell demultiplexing unit 21" comprises two units: a terminal side cell demultiplexing unit 22 receiving as its input the cells from the terminal equipment 15 and a switch side cell demultiplexing unit 23 receiving as its input the cells from the switching apparatus 11.

On the other hand, when viewing the cell multiplexing part, as shown in FIG. 1, it has a cell multiplexing unit 31 for multiplexing the user cells UC separated by the cell demultiplexing unit 21 and the control information cells CIC sent from the processor 13 in each line apparatus 12.

Figure 4:
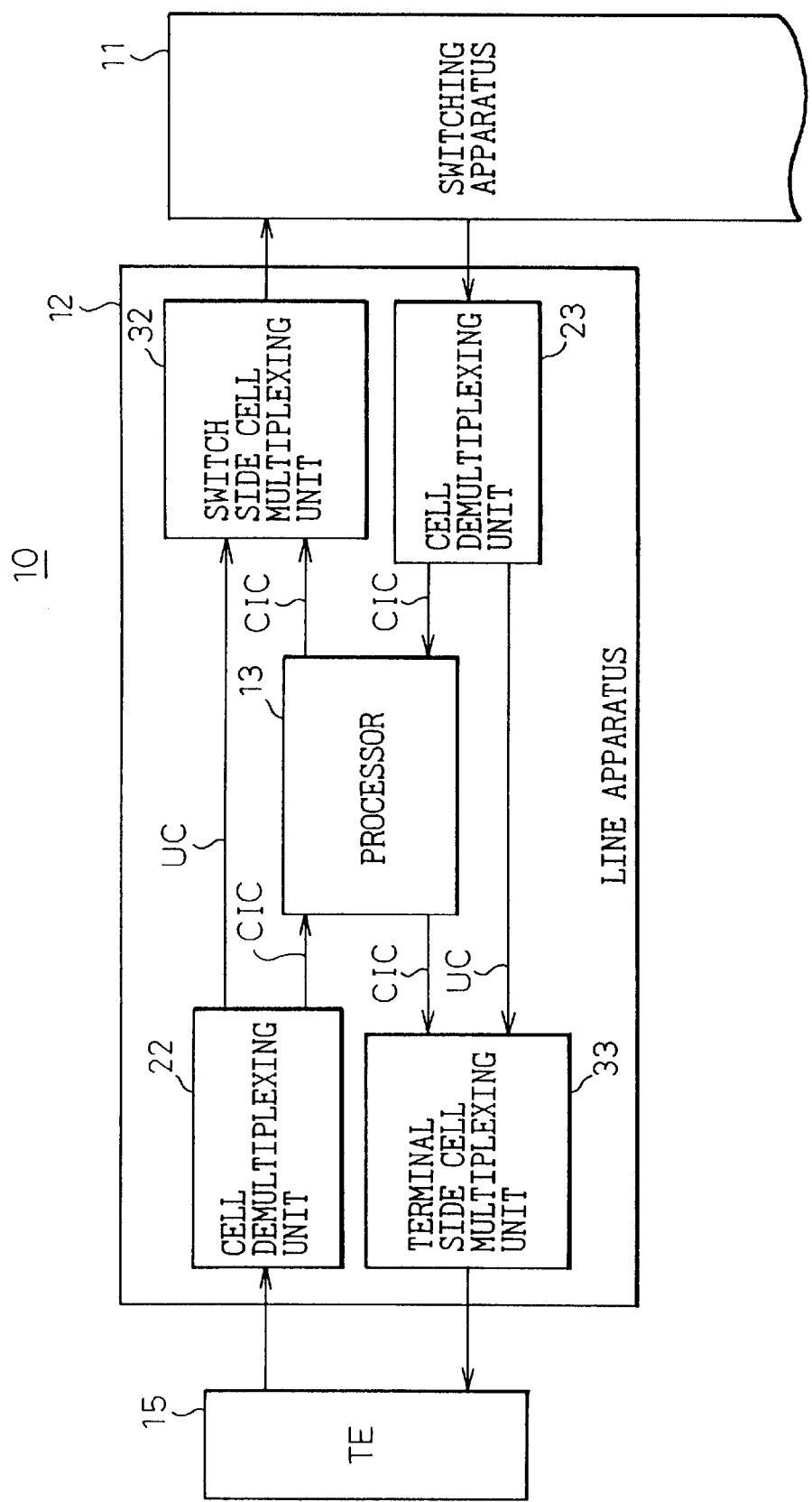
FIG. 4 is a view of an actual example of a cell multiplexing unit 31 shown in FIG. 1.

FIG. 4 is a view of an actual example of the cell multiplexing unit 31 shown in FIG. 1.

As shown in the figure, the "cell multiplexing unit 31" comprises two units as well: a switch side cell multiplexing unit 32 for outputting cells to the switching apparatus 11 and a terminal side cell multiplexing unit 33 for outputting cells to the terminal equipment 15.

Figure 5:
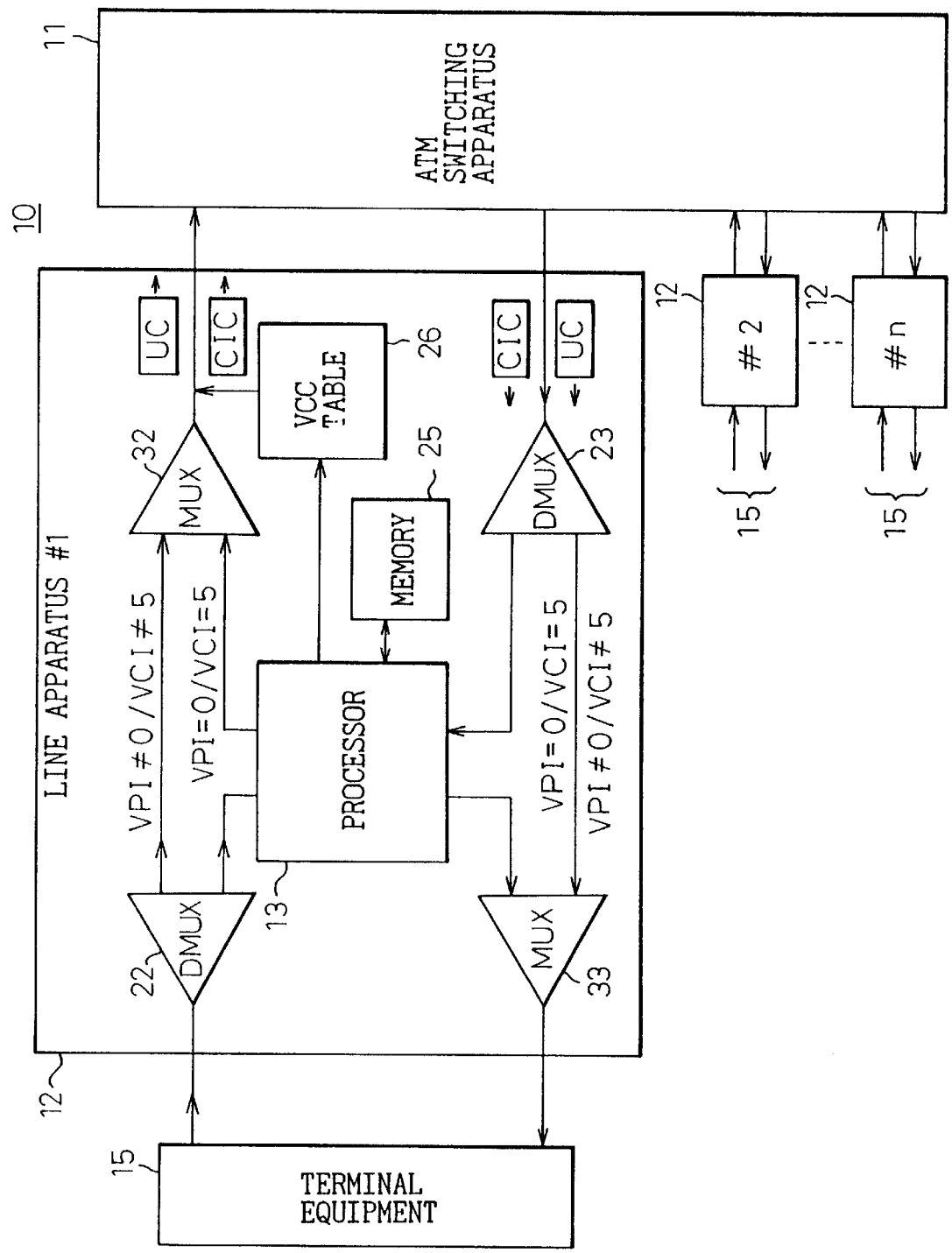
FIG. 5 is a view of an embodiment of a line apparatus according to the present invention.

FIG. 5 is a view of an embodiment of a line apparatus according to the present invention. Note that all of the plurality of line apparatuses 12 (#1 to #n) have the same configuration, therefore only the line apparatus 12 (#1) will be shown in detail as a representative case.

The point which should be noted first in FIG. 5 is that the BSGC apparatus 16, the call processing processor 17, and the high speed bus 18 in the multiprocessor configuration of the related art shown in FIG. 25 are completely eliminated. For this reason, in addition to the usual ATM cells (user cells UC) in the ATM exchange, control information cells CIC are introduced. The control information cells CIC are communicated among a plurality of processors 13 via the switching apparatus 11.

In the line apparatus 12 (#1) of FIG. 5, the already explained constituent elements are the processor 13, the terminal side cell demultiplexing unit (DMUX) 22, the terminal side cell multiplexing unit (MUX) 33, the switch side cell multiplexing unit (MUX) 32, and the switch side cell demultiplexing unit (DMUX) 23.

Other than these, the constituent elements 25 and 26 play important roles. Note that these constituent elements 25 and 26 are general ones in usual line apparatuses. Namely, they are the memory 25 and the routing table 26. The VCC table is shown in the example of the figure as the routing table 26.

In the memory 25, a program required for operating the processor 13 is initially loaded. Furthermore, the memory 25 stores subscriber data and office data indispensable for performing the call processing by the processor 13.

Figure 6:
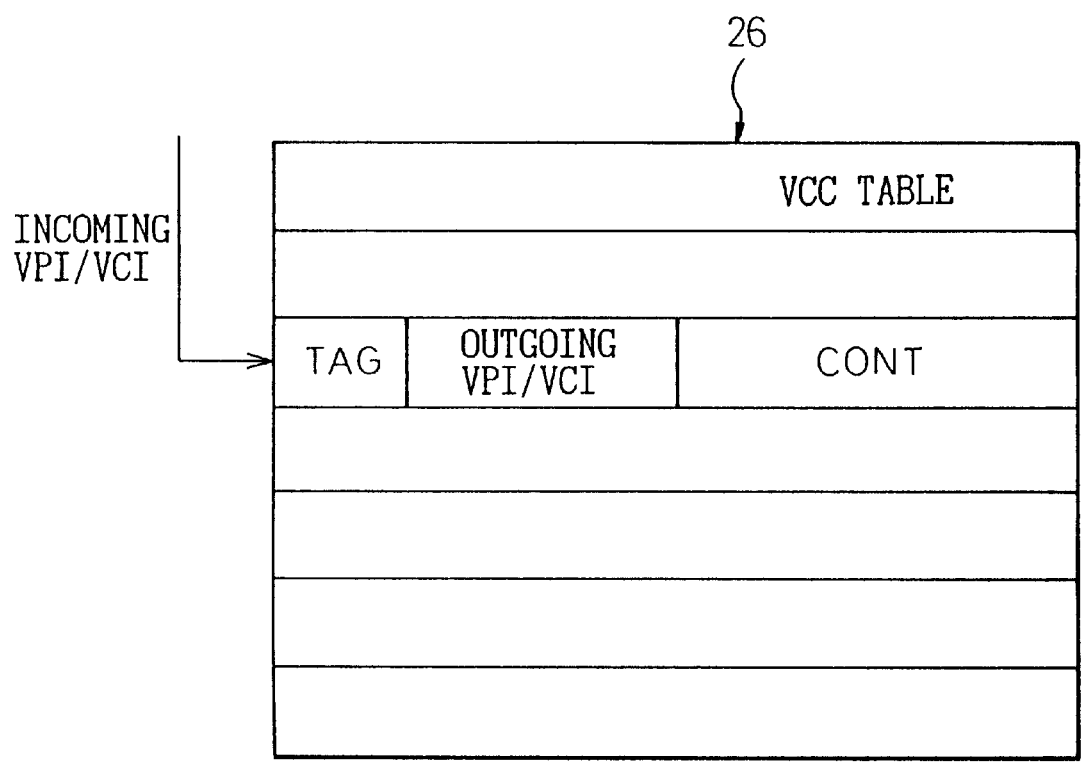
FIG. 6 is a view of an example of a virtual channel connection (VCC) table in FIG. 5.

FIG. 6 is a view of an example of the VCC table in FIG. 5. This indicates the VCC table as a routing table 26, that is, a table for outputting corresponding routing path information ("TAG, outgoing VPI/VCI" in the figure) by using the routing path information of the incoming cells, as the address, for example VPI/VCI (virtual path identifier/virtual channel identifier). "TAG" is tag information instructing the path when the related cell is transferred in the switching apparatus 11. Other than this, an information field CONT is stored in the table 26. In this information field CONT, information to be written in the header area of the cell etc. are stored.

Figure 7:
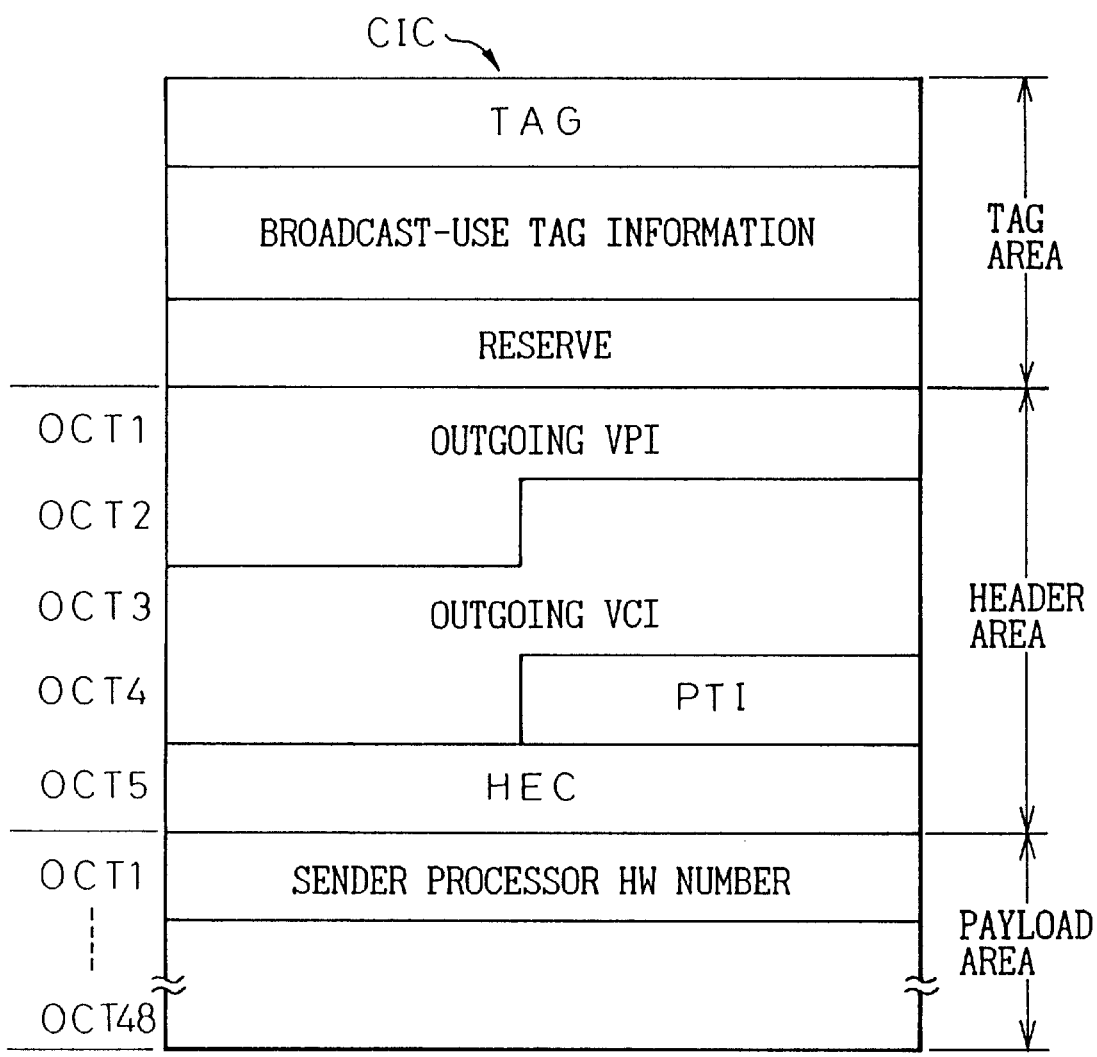
FIG. 7 is a view of a format of a cell input to a switching apparatus 11 from a line apparatus 12.

FIG. 7 is a view of the format of a cell to be input to the switching apparatus 11 from the line apparatus 12. Note that this is one example. Usually, each cell comprises at least a header area and a payload area, but each control information cell CIC used in the present invention has a specific identification code in the header area which is distinguishable from user cells UC. At the same time, a tag area for storing tag information specifying at least the destination processor 13 is further added to the control information cell sent from the processor 13. This tag information is written into the routing table 26 in the same figure in advance by the processor 13 of FIG. 5.

The special identification code which is distinguishable from user cells UC adopts VPI=0/VCI=5 in the present invention. They are shown also in FIG. 5. Conversely, VPI≠0/VCI≠5 is used for the user cell UC.

In FIG. 7, "PTI" is a payload type identifier field, and "HEC" is a header error control field. Both of them are well known. Note that the broadcast use TAG information in the tag area is information required only when the control information cell CIC is broadcast to a plurality of processors 13 as will be explained later. Further, a sender processor HW number in the payload area is a highway (HW) number for clearly indicating the destination address of this sender processor when the sender processor wants to receive a certain reply from the destination processor 13.

Namely, in the communication among processors, in order to ask for a reply from the destination processor of the control information cell, an indication code (processor HW number) indicating the origination processor of the control information cell is stored in the payload area of the control information cell.

Here, an explanation will be made of the operation of the exchange by referring to FIG. 5, FIG. 6, and FIG. 7.

A cell coming from the subscriber of the terminal equipment 15 side (having VPI=0/VCI=5) is fetched into the processor 13 in the line apparatus 12. Further, a cell going to the subscriber is sent from the processor 13 in the line apparatus 12.

When communication is carried out among the line apparatuses 12, by setting the HW (highway) information (TAG) of the opposing line apparatus 12 in the region of VPI=0/VCI=5 in the VCC table 26 and sending a cell having VPI=0/VCI=5 from the processor 13, it becomes possible to send cells to the processor 13 in the opposing line apparatus 12. In this case, to notify the processor of the sender line apparatus to the processor of the opposing line apparatus, as mentioned by referring to FIG. 7, the HW number (processor HW number) of the sender line apparatus is set in the payload area of the cell. By this, when the processor 13 of the destination side (reception side) replies to the sender processor, by setting the processor HW number thereof in the TAG field of the VCC table 26 and sending a cell having VPI=0/VCI=5, it becomes possible to automatically return information to the sender processor 13.

Thus, the system according to the present invention is basically a system using ATM cells for the communication of control information among processors 13 and comprises a switch side cell multiplexing unit 32 for sending the user cells UC and the control information cells CIC from the processor 13 to the switching apparatus 11 and a routing table (VCC table) 26 for setting VPI/VCI (routing path information) and TAG information of the outgoing line to the cells from this cell multiplexing unit 32.

The VPI/VCI forming the specific identification code (above VPI=0/VCI=5) is used for the communication among processors. Tag information TAG is set, before the control information cell is sent to the opposing line apparatus 12, to the data of VPI=0/VCI=5 stored in the routing table (VCC table) 26 to lead the same to the opposing line apparatus 12. The outgoing VPI/VCI is set to 0/5. Further, by giving, from the processor 13, its own HW number (indication code) in the payload area and passing cells through the cell multiplexing unit 32, the control information is transferred to the opposing processor.

On the other hand, the system of the present invention is provided with the switch side cell demultiplexing unit 23 for inputting cells having a specific VPI/VCI (=0/5) among the cell group from the switching apparatus 11 to the processor 13 in the line apparatus 12 of the destination side (reception side) and thus fetches the cells having VPI/VCI (=0/5) in the header area into the processor, thereby communicating control information with the processor 13 of the sender line apparatus 12.

Figure 8:
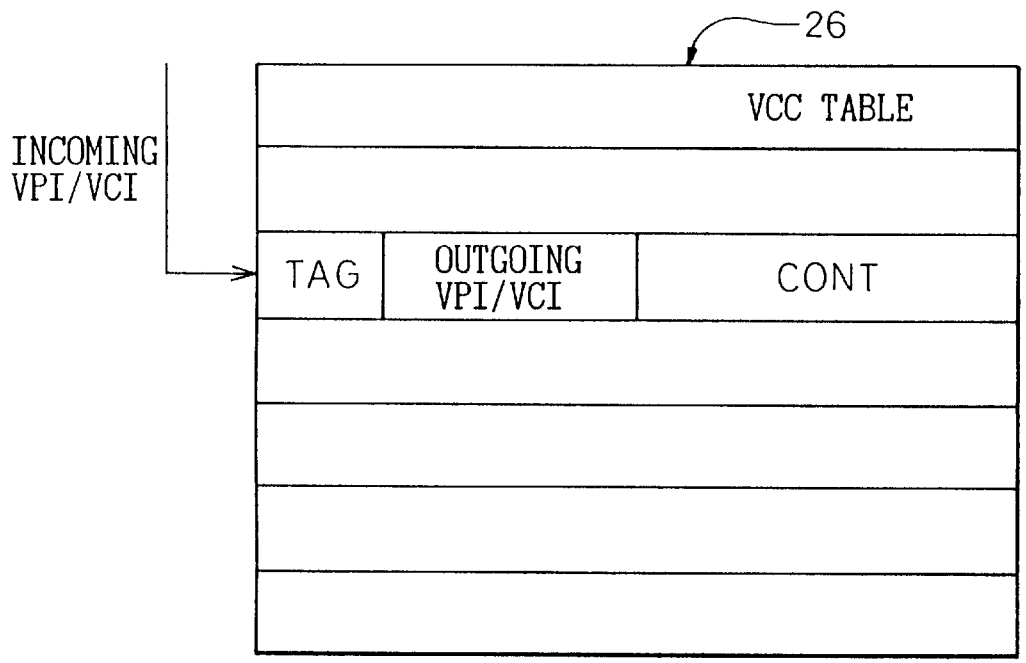
FIG. 8 is a view of another example of the VCC table in FIG. 5.

FIG. 8 is a view of another example of the VCC table in FIG. 5. When looking at the above reply, the destination processor 13 receiving a control information cell, when replying to the sender processor 13, sets the HW (highway) information stored in the payload area of the received cell in the TAG area of the area designated by VPI/VCI (0/5) in the routing table (VCC table) 26 (refer to TAG of FIG. 8) and, at the same time, sets its own HW number in the payload area of the cell, then returns the cell to the sender processor 13.

According to the system of the present invention, broadcast communication where the same control information cell is sent from one sender processor 13 to a plurality of destination processors 13 by utilizing the inherent broadcast function of an ATM exchange can be easily realized. For the realization of this broadcast communication, preferably the following various types of identifiers and reply indication codes (i) to (iv) are adopted.

(i) A first broadcast identifier (B1) for designating whether or not communication among processors is carried out by broadcast communication is contained in the control information cell CIC sent from the processor 13.

(ii) A second broadcast identifier (B2) for designating whether or not communication among the processors is carried out by broadcast communication with respect to a certain specific processor or carried out by broadcast communication with respect to all processors is contained in the control information cell CIC sent from the processor 13.

(iii) A reply identifier (RP) for designating whether or not a reply to the broadcast information is to be sought from the destination processor 13 by the sender processor 13 of the broadcast information in the communication among processors carried out by broadcast communication is contained in the control information cell CIC sent from the processor 13.

(iv) A reply indication code (RPCD) for indicating the replying processor 13 is stored in the payload area of the control information cell CIC from the destination processor 13 from which the reply was sought.

Figure 9:
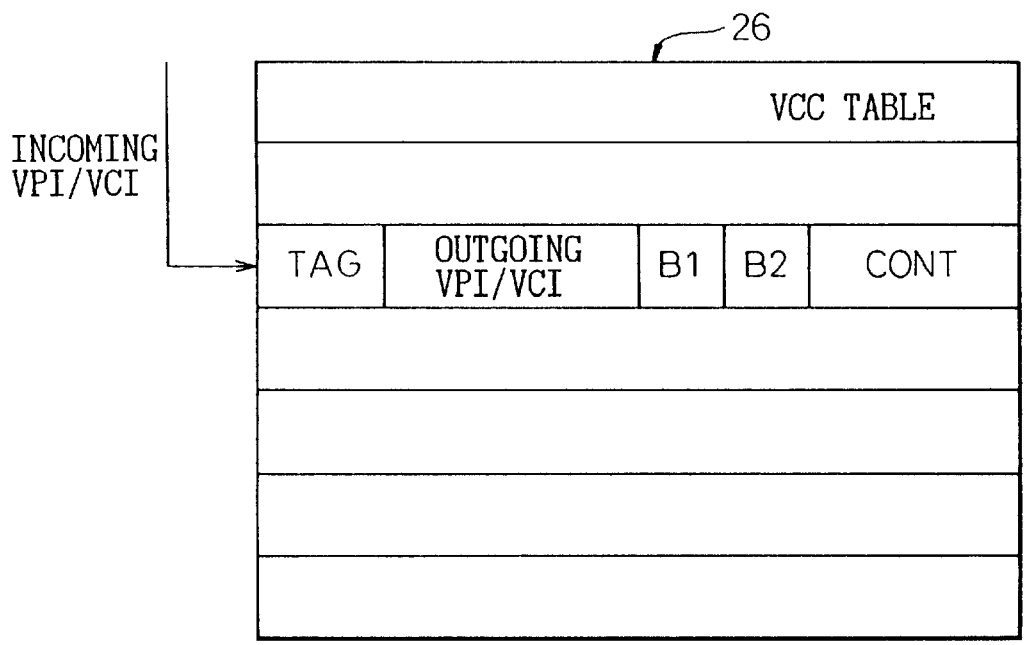
FIG. 9 is a view of still another example of the VCC table in FIG. 5.

FIG. 9 is a view of still another example of the VCC table in FIG. 5. In this VCC table 26, information necessary for broadcast communication is stored.

Figure 10:
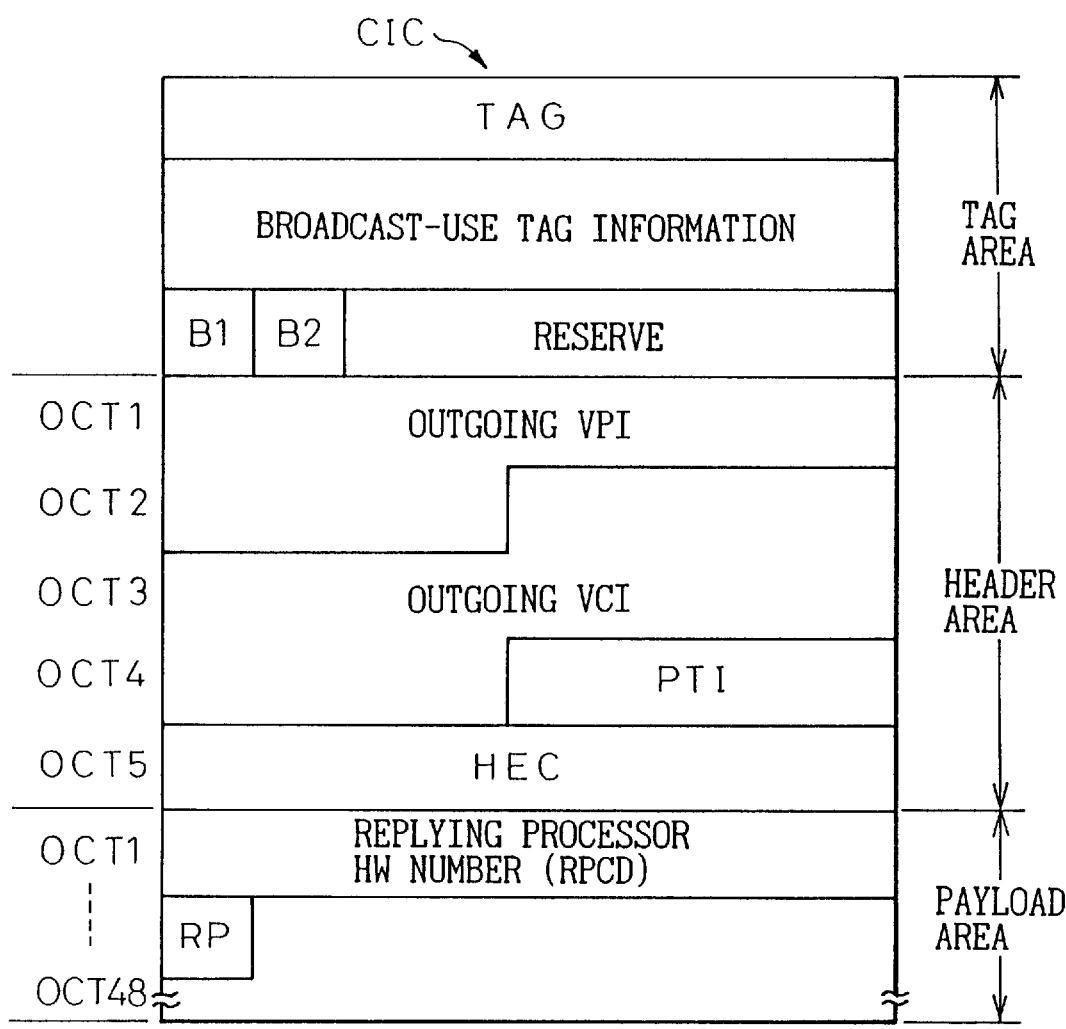
FIG. 10 is a view of an example of the format of the cell when a broadcast communication is carried out.

FIG. 10 is a view of an example of the format of the cell when broadcast communication is carried out. In the figure, identifiers B1, B2, and RP and the reply indication code (RPCD) are shown.

Referring to FIG. 9 and FIG. 10, fields of a first broadcast identifier B1 ("1": broadcast is required, "0": broadcast is not required) and a second broadcast identifier B2 ("1": broadcast is carried out for only the designated processor, "0": broadcast is carried out with respect to all processors) for discriminating whether broadcast communication is to be carried out with respect to all HWs (highways), that is, all processors 13, or broadcast communication is to be carried out with respect to only the designated processor when this first broadcast identifier B1 is "1" are provided in the routing table (VCC table) 26. Further, as the above reply identifier RP, for example, fields of the reply identifier RP ("1": replies from all processors are required, "0": reply is required from only the processor satisfying conditions) for discriminating whether the replies from all the receiving processors 13 are required or only a reply from a specific processor 13 is required are provided.

The processor 13 receiving this broadcast use control information cell CIC checks the "1" or "0" of the reply identifier RP, if a reply is required and when returning a cell, gives the reply indication code RPCD indicating the HW (highway) number of the replying processor to the payload area of this cell, and thereby the above reply is accomplished, and thus realizing the communication among processors. This broadcast communication can be effectively utilized when setting up a call, explained next.

The most important function in the multiprocessor type ATM exchange is a call set-up. A call set-up means the formation of a path via the switching apparatus 11 between the originating subscriber and the destination subscriber. This call set-up had been carried out by the BSGC apparatus 16 and the call processing processor 17 in the ATM exchange of the related art shown in FIG. 25, but in the ATM exchange of FIG. 5 according to the present invention, which eliminated these BSGC apparatus 16 and the call processing processor 17, each processor 13 performs the call set-up by using the control information cells CIC.

In the present invention, the method of call set-up differs according to either of the following two cases (i) and (ii):

(i) Case where all processors 13 commonly hold the subscriber data and office data.

(ii) Case where each processor 13 holds only the subscriber data of the subscribers accommodated by itself or the office data of the adjacent office.

Note that, the above subscriber data and office data are held in the memory (memory 25 of FIG. 5) cooperating with each processor 13.

Of the above cases (i) and (ii), the broadcast communication is effectively utilized for the case (ii).

CASE (i)

When connecting a call between one subscriber on the terminal side and another subscriber on the terminal side, where all processors 13 commonly hold the subscriber data and office data, the call set-up information from the processor 13 to which the call origination side subscriber belongs is stored in the payload area of the control information cell CIC and sent to the processor 13 to which the call destination side subscriber belongs. The response information with respect to the call set-up information from the processor 13 to which this call destination side processor belongs is stored in the payload area of the control information cell CIC and returned to the processor 13 to which the call origination side subscriber belongs. This realizes the connection of the call.

CASE (ii)

When connecting a call between one subscriber on the terminal side and another subscriber on the terminal side, where each processor 13 holds only the subscriber data of the subscribers accommodated by the processor or the office data of the adjacent office, the related call set-up information from the processor 13 to which the call origination side subscriber belongs is stored in the payload area of the control information cell CIC and sent to all processors 13 by the broadcast communication. The response information with respect to the related call set-up information from the processor 13 which is determined to accommodate the call destination side subscriber corresponding to the related call set-up information is stored in the payload area of the control information cell CIC and returned to the processor to which the call origination side subscriber belongs. This realizes the connection of the related call. In the above CASE (ii), when the control information cell CIC is sent to all processors 13 by broadcast communication, and the above-mentioned response information is returned from a plurality of processors, the related call is connected with the processor 13 which returned the first response information and, at the same time, the control information cell CIC containing the release information is returned to the processor 13 which returned the second and following response information.

A detailed explanation will be made next of the case (i). First, the B1 bit and B2 bit in the routing table (VCC table) 26 shown in FIG. 9 are set to "0", and the HW number of the opposing processor (call destination side processor) is set in the TAG information field. By this, communication with the opposing processor is directly carried out, and a connection/disconnection request from the subscriber is realized.

Figure 11:
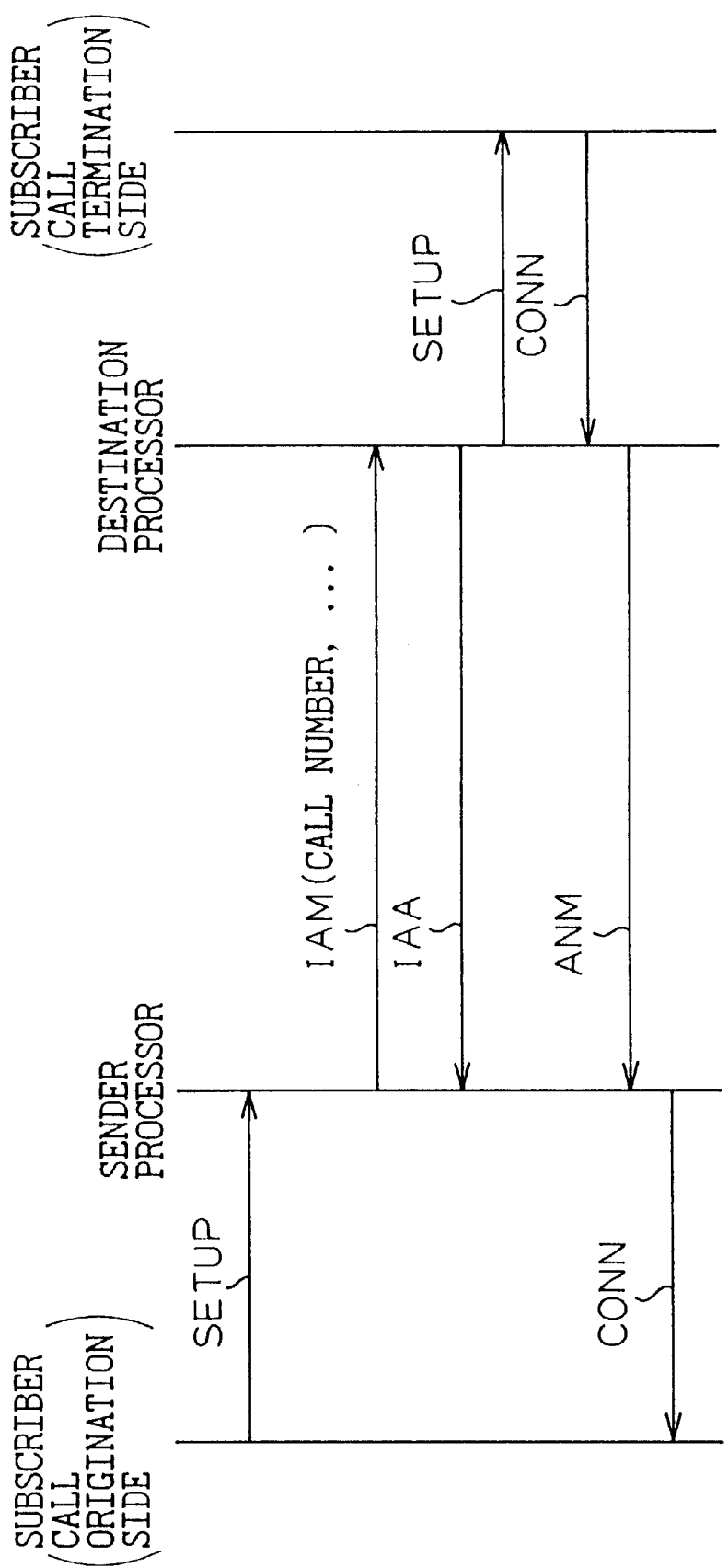
FIG. 11 is a sequence diagram of an example of a protocol in a case (i)

FIG. 11 is a sequence diagram showing an example of the protocol in the case (i). In the figure, the sender processor 13 receiving the SETUP signal from the originating subscriber on the terminal equipment 15 side checks whether or not the call origination is possible according to the origination telephone number and, if the call origination is OK, analyzes the call destination side and obtains the HW (highway) number to which the destination processor 13 is connected.

The HW number is set in the TAG field (FIG. 9) of the VCC table 26 in the sender processor. Further, values of the B1 and B2 bits (FIG. 9) in the VCC table 26 are set to "0" since broadcast communication is not required. Thereafter, an IAM message containing the call number is sent toward the destination processor. In this case, since broadcast communication is not carried out, "0" is set as the reply identifier RP (FIG. 10).

The destination processor receiving the IAM message sends the reply of an IAA message to the sender processor. Simultaneously with this, a SETUP signal is passed to the destination subscriber. When the destination processor receives the CONN message indicating the connection from this destination subscriber, this processor further returns an ANM message indicating the response to the sender processor. Finally, the CONN message is returned to the originating subscriber. Note that, after this, for the processing of the related call, one-to-one communication is carried out between the two processors based on the HW number stored in the memory 25 together with the above call number.

Figure 12:
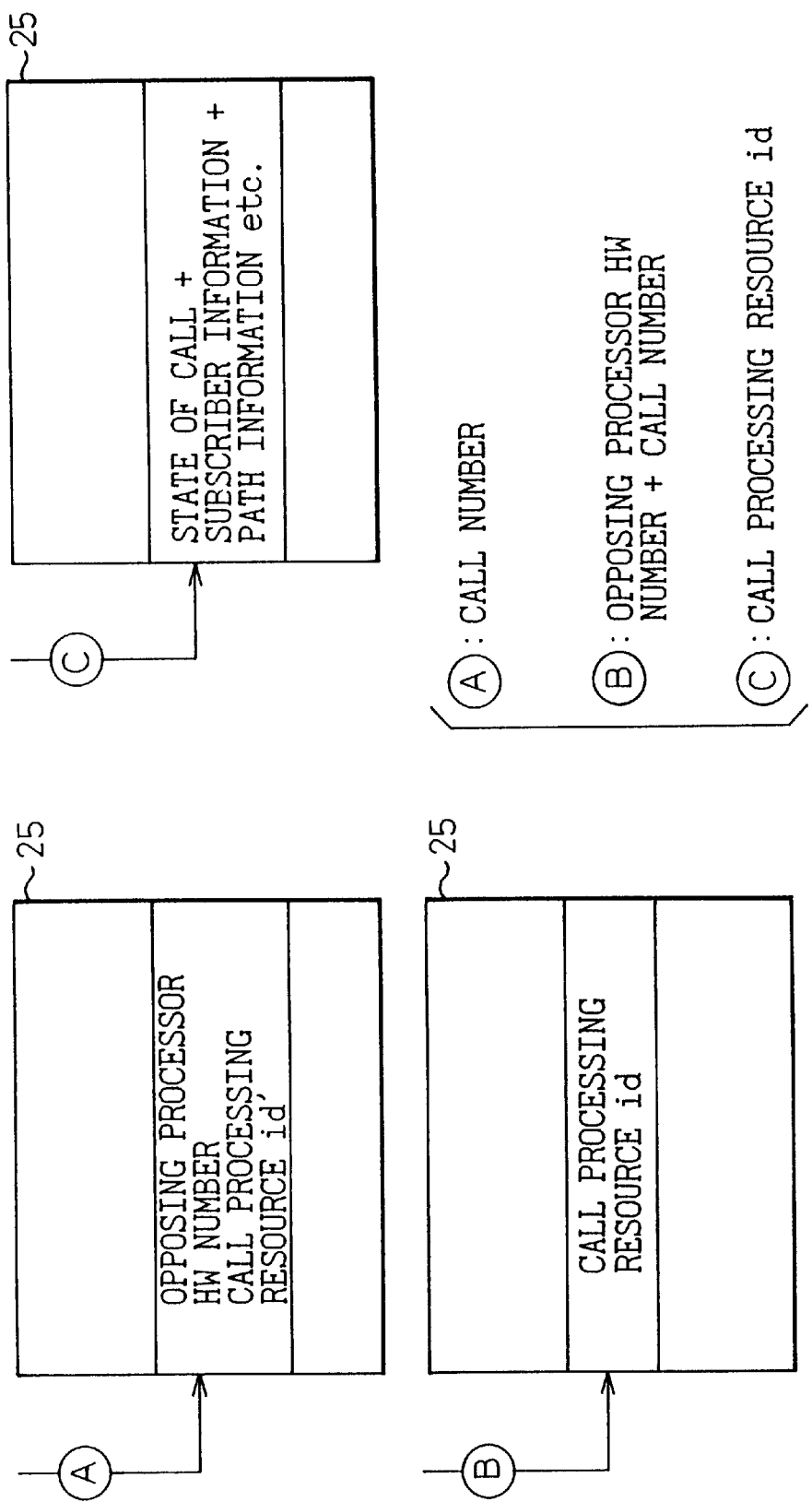
FIG. 12 is a view of a situation of memory access by a sender (call origination side) processor receiving a SETUP signal.

FIG. 12 is a view of the situation of the memory access by the sender (originating) processor receiving the SETUP signal. This memory is the memory 25 of FIG. 5 and is a memory access indispensable for the execution of the sequence represented in FIG. 11 (case (i)). Note that it is a memory access indispensable for also the execution of the sequence represented in FIG. 14 (case (ii)) mentioned later.

First, the memory 25 is accessed by using the call number as the address A so as to obtain the opposing processor HW number and the call processing resource id (so-called a transaction ID).

Next, the memory 25 is accessed by using (opposing processor HW number+call number) as the address B so as to obtain the call processing resource id.

Finally, the memory 25 is accessed by using the call processing resource id as the address C so as to obtain a call state (for example a state transition of FIG. 11), subscriber information (telephone number of the subscriber in the SETUP signal and situation of the destination side etc.), path information (VCI value and VPI value when the path is actually connected), etc.

Figure 13:
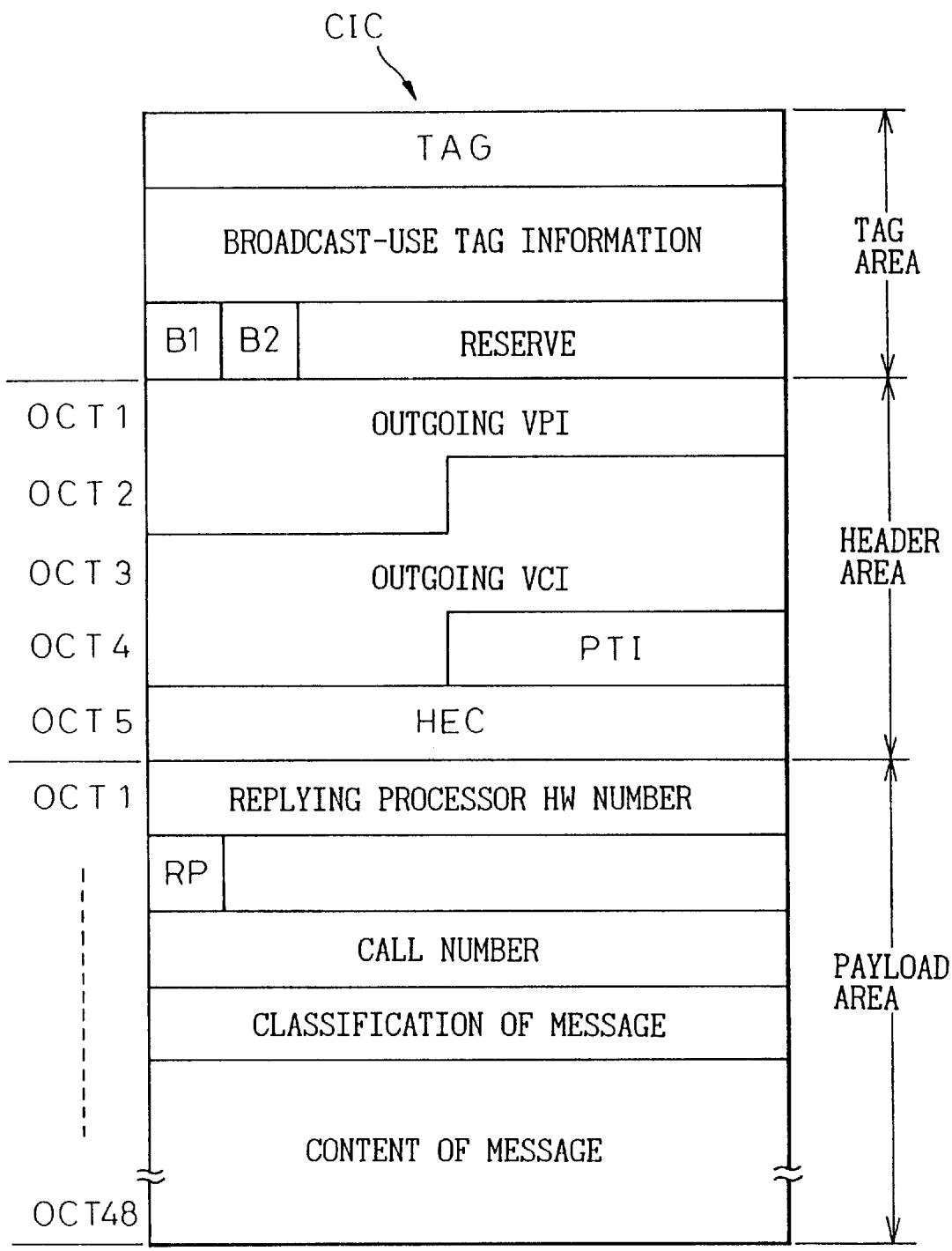
FIG. 13 is a view of an example of the format of the control information cell.

FIG. 13 is a view of an example of the format of the control information cell. This cell format is adopted in also the sequence of FIG. 11 (case (i)) mentioned above and in also the sequence of FIG. 14 as will be explained later.

This format shown in FIG. 13 represents the format shown in FIG. 10 in further detail and is comprised by a field of the call number, fields of the classification of message (IAM message, IAA message, state of call, subscriber information, telephone number, . . . , etc.), and a field of the message content for modifying the message.

Figure 14:
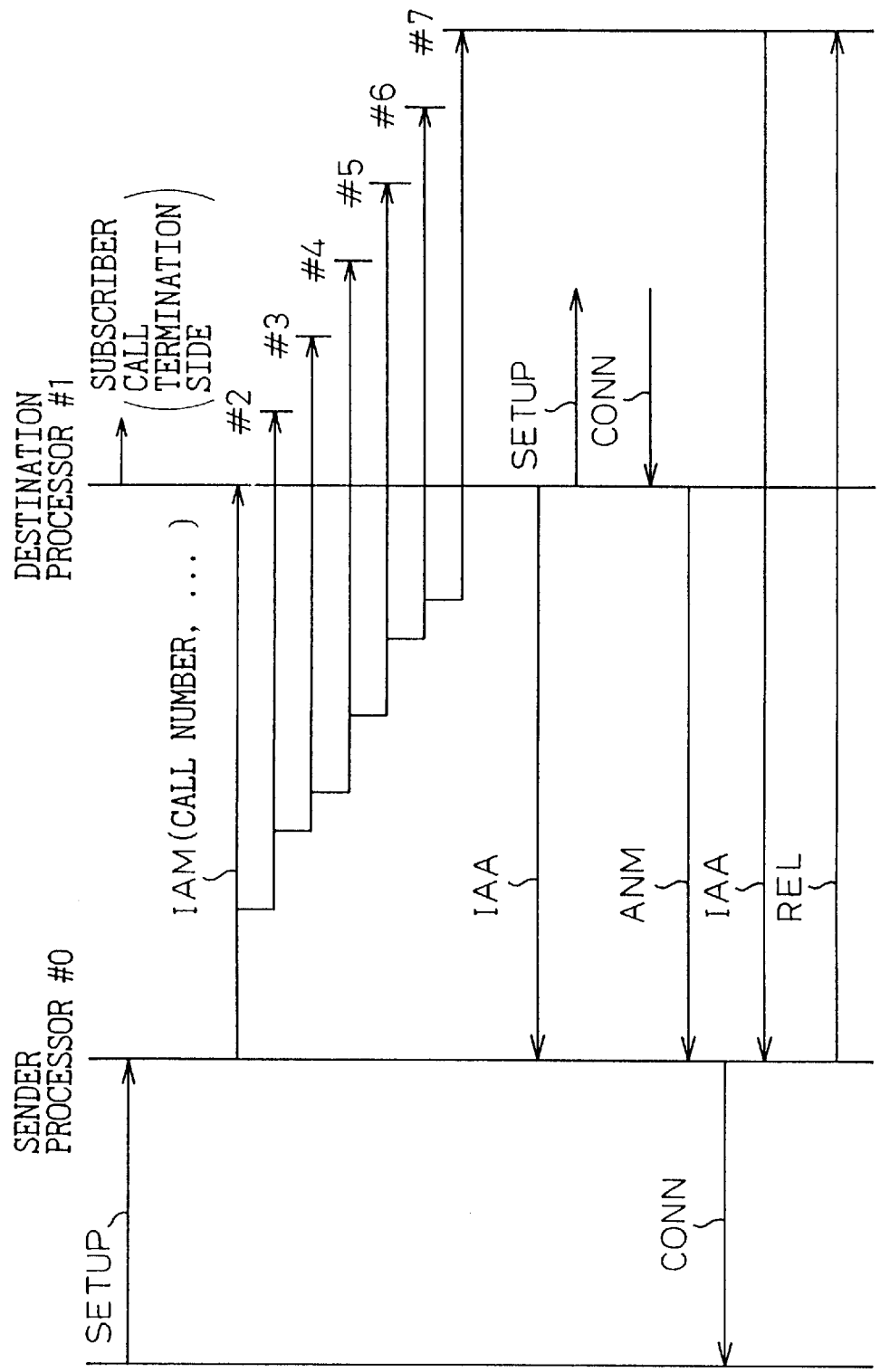
FIG. 14 is a sequence diagram of an example of a protocol in a case (ii)

FIG. 14 is a sequence diagram of an example of the protocol in case (ii). In this sequence, the broadcast communication is required.

In the case (ii), the opposing processor cannot be specified, therefore "1" is set in the B1 bit of the VCC table 26 shown in FIG. 9. By this, the broadcast communication is designated, and the same cell can be sent to all processors 13. The same cell is formed by copying in the switching apparatus 11.

Explaining this in further detail, the sender processor 13 receiving the SETUP signal from the subscriber of the terminal equipment 15 side checks whether or not the call origination is possible according to the origination telephone number and, if the call origination is OK, sends an IAM message containing the call number to all processors (#1 to #7) by the broadcast communication. In this case, "0" is set in the reply identifier PR (FIG. 13). Each destination processor receiving the IAM message analyzes the termination telephone number (call number) and returns an IAA message to the sender processor #0 when the call number is one of the telephone numbers belonging to the processor. If it is found, as a result of the above analysis, by the processor that the termination telephone number is a telephone number not related to itself, the IAM message is cancelled.

The sender processor #0 sending the IAM message may receive IAA messages from a plurality of processors (any of #1 to #7). In such a case, only the processor sending the IAA message which reaches the processor first is stored on the memory 25 belonging to the processor 13 (#0) (HW number) together with the call number. For the IAA messages received second and later, a release (REL in the figure) is sent to the processors sending the message. After this, for the processing of the corresponding call, one-to-one communication is carried out between the two processors based on the HW number stored in the memory 25 together with the call number. Note that the meanings of SETUP, ANM, and CONN in the present figure are as explained by referring to FIG. 11.

The above embodiment was explained regarding the case where the line apparatus 12 to which the one subscriber belongs and the line apparatus 12 to which the other subscriber belongs are different. However, there also exists a case where both of the one subscriber and the other subscriber belong to the same line apparatus 12. Particularly, this is because, in the present invention, the terminal equipment 15 can be not only the terminal equipment of a single subscriber, but also a PBX or a small scale LAN or other group of terminal equipment accommodating a plurality of subscribers.

When the terminal equipment 15 is comprised of a PBX or a small scale LAN, so-called "extension communication" is performed among the subscribers. In such a case, of course it is also possible to perform such extension communication by using the switching apparatus 11 as in the above embodiment. However, the use of the switching apparatus 11 via such extensions is not preferred from the viewpoint of the efficient utilization of resources.

Therefore, where both of the one subscriber and the other subscriber are accommodated by the same line apparatus 12 and therefore extension communication is carried out between them, a by-pass, without using the switching apparatus 11, is formed between the two subscribers.

For this reason, a cell return loop unit is provided in each line apparatus 12. When connecting a call between one subscriber on the terminal side and another subscriber on the terminal side, if it is judged that both of the subscribers are accommodated by the same processor 13, the related user cell is not sent to the switching apparatus 11, but is returned at the cell return loop unit to set up the call between the two subscribers.

Figure 15:
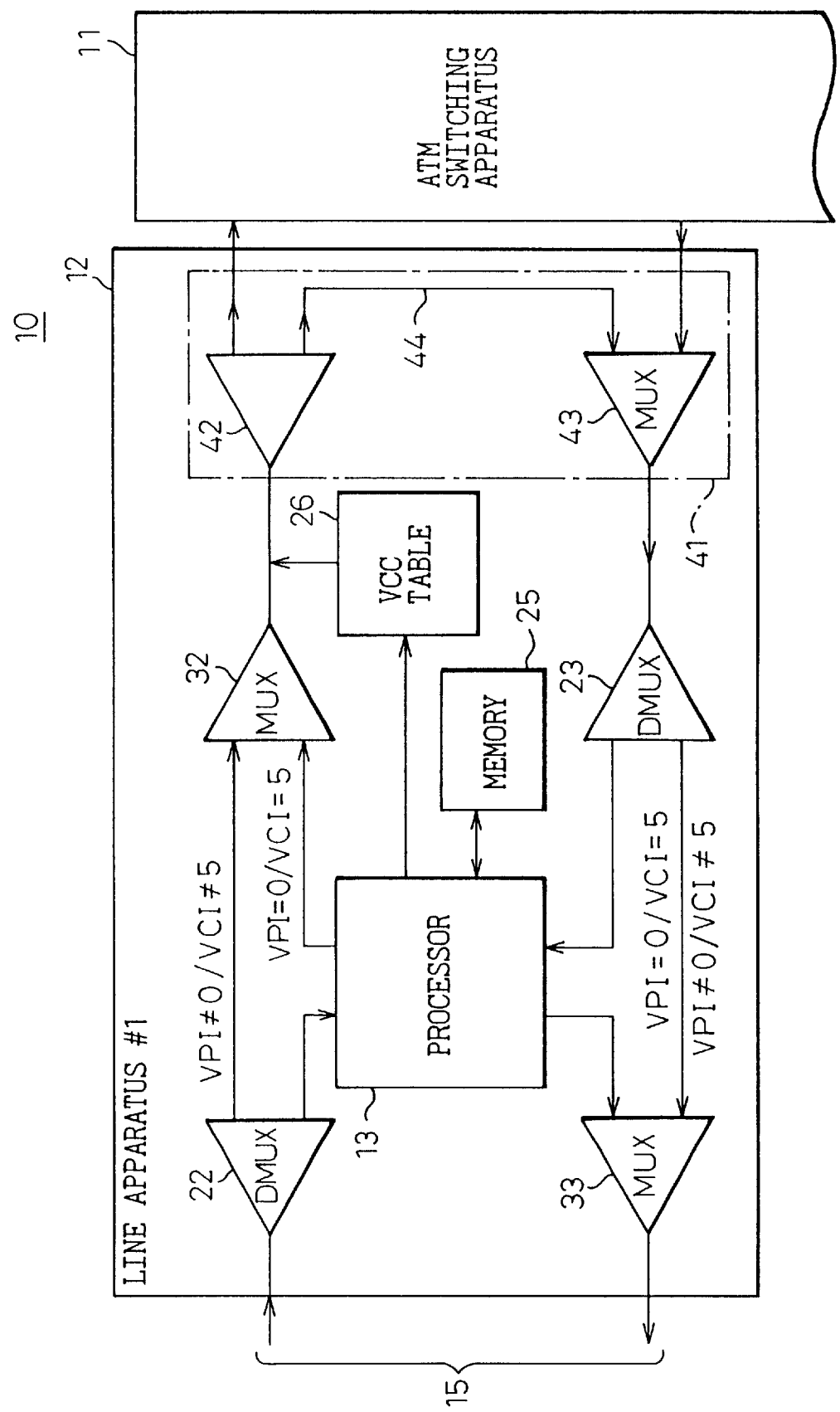
FIG. 15 is a view of an example of a line apparatus having a cell return loop unit.

FIG. 15 is a view of an example of a line apparatus having a cell return loop unit. The cell return loop unit 41 comprises a cell return judging means 42, a cell multiplexing means 43, and a loop path 44 connecting these two means. This loop path 44 forms the above by-pass not passing through the switching apparatus 11.

Figure 16:
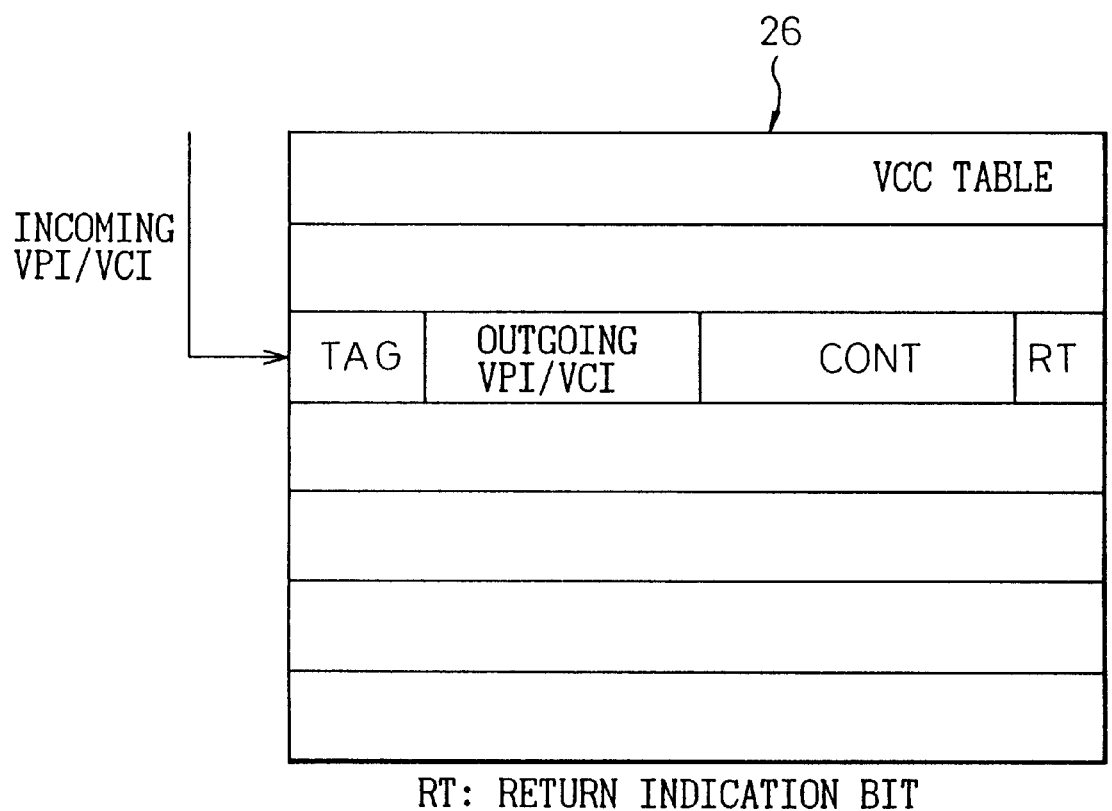
FIG. 16 is a view of an example of the VCC table in FIG. 15.
Figure 17:
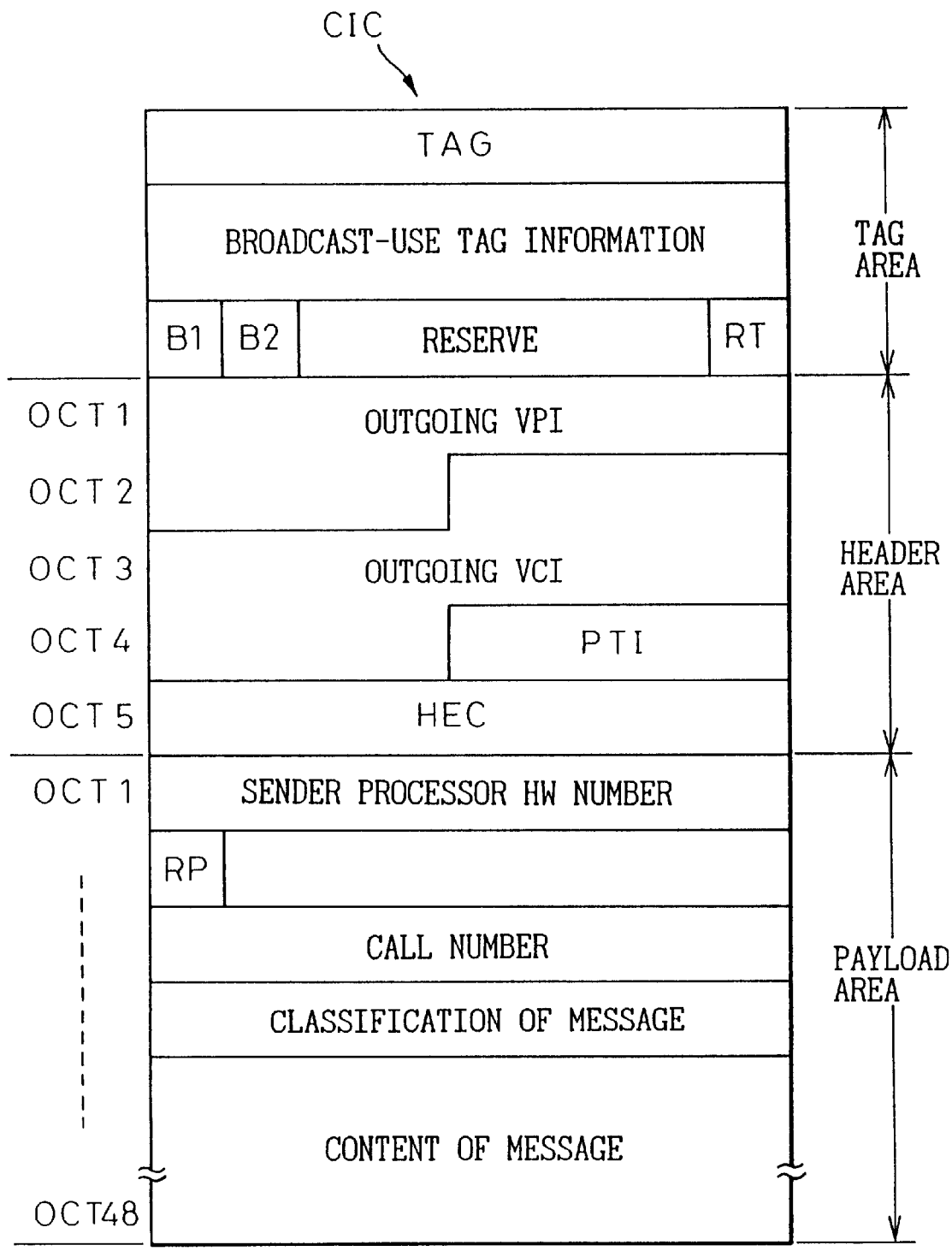
FIG. 17 is a view of an example of the format of the control information cell used in the configuration of FIG. 15.

FIG. 16 is a view of an example of the VCC table in FIG. 15; and FIG. 17 is a view of an example of the format of the control information cell used in the configuration of FIG. 15.

The return indication bit RT in the header area is set "1" and returned in the line apparatus 12, whereby the cell is sent back to the subscriber on the terminal equipment 15 side. As a result of the call destination analysis by the processor 13, the destination terminal equipment is found to belong to the same processor, therefore the IAM message etc. are not sent. Instead, the return indication bit RT and the opposing VPI/VCI are set in the VCC table 26 at the control information VPI/VCI, the SETUP message is sent to the destination side, and the cell is returned inside the processor.

The above embodiment is based on that the required subscriber data and office data are stored in the memory 25 in each line apparatus 12. When installing these data, the method of writing the data in the memory 25 in the line apparatus 12 in advance for every line apparatus 12 may be used. However, such a writing operation is not efficient.

In order to eliminate such inefficient work, one of the plurality of line apparatuses 12 is used as an operation and maintenance apparatus. This operation and maintenance apparatus communicates the control information cell for the operation and maintenance of the entire exchange with each processor 13.

Figure 18:
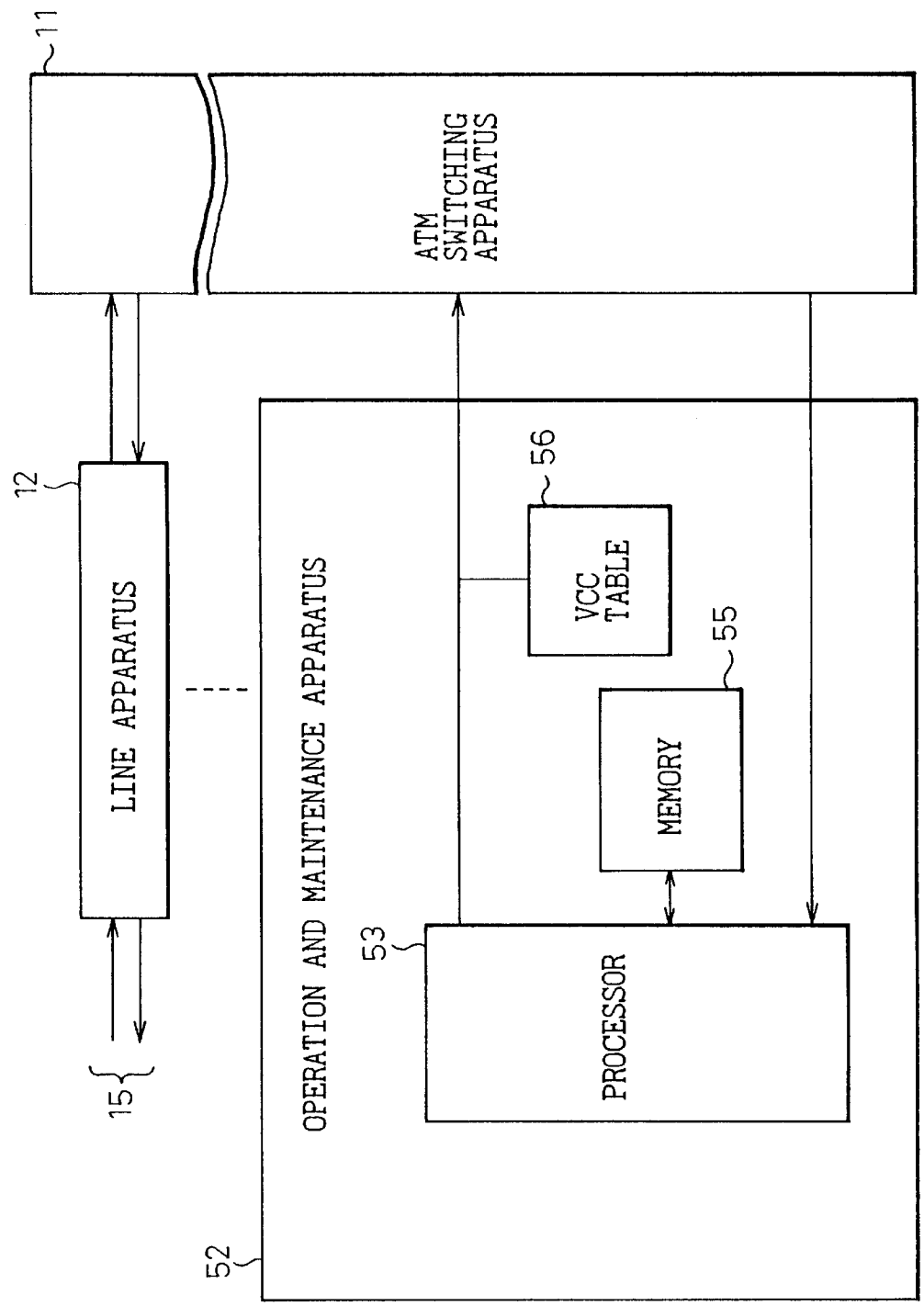
FIG. 18 is a view of an example of an operation and maintenance unit.

FIG. 18 is a view of an example of the operation and maintenance apparatus. The operation and maintenance apparatus 52 basically has a similar structure to that of each line apparatus 12 mentioned above, and constituted by a processor 53, a memory 55 and a routing table (VCC table) 56.

Figure 19:
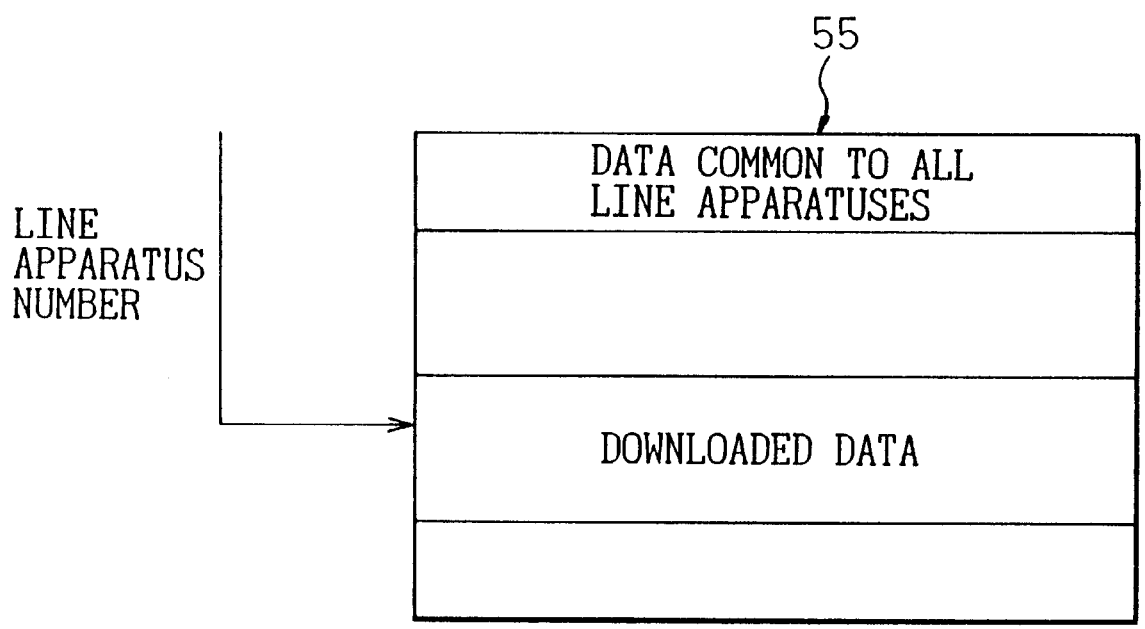
FIG. 19 is a view of the content of the memory in the operation and maintenance unit in FIG. 18.

FIG. 19 is a view showing the content of the memory in the operation and maintenance apparatus in FIG. 18. The memory 55 in the operation and maintenance apparatus 52 is accessed by the number (#0, #1, #2, . . . ) of the line apparatus 12 to be maintained. The contents of the memory are, for example, data common to all line apparatuses 12, such as system program and download data, e.g., subscriber data, office data, the number information given to each line apparatus, and the HW (highway) number used by each line apparatus etc. They are data indispensable at the startup of the system. Note that, enormous data such as the system program are entered into the payload area of the control information cell and repeatedly transferred.

Thus, a path for installation etc. is set between the operation and maintenance apparatus 52 and each line apparatus 12, so the subscriber data and office data can be downloaded into each line apparatus 12.

When the operation and maintenance information to be placed in the control information cell and transferred from the operation and maintenance apparatus 52 is common to all processors 13 (common data), the operation and maintenance apparatus 52 performs the communication with the processors 13 by the broadcast communication explained above to distribute the operation and maintenance information to the processors 13. On the other hand, when the operation and maintenance information is information with respect to a specific processor 13, the communication among processors is carried out by the one-to-one communication with the above specific processor.

Figure 20:
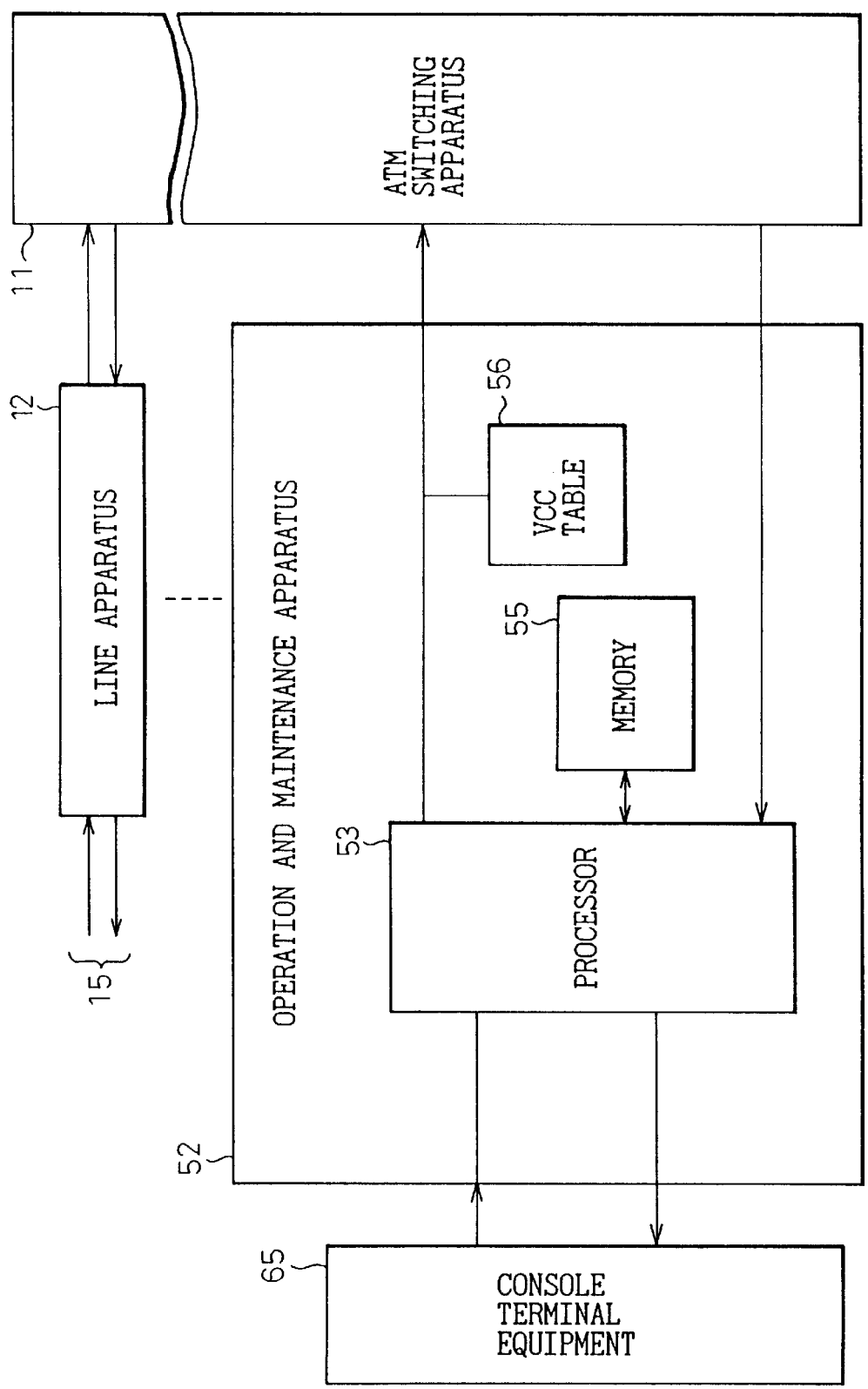
FIG. 20 is a view of an example of a remote control type operation and maintenance unit.

FIG. 20 is a view of an example of a remote control type operation and maintenance apparatus. In the configuration of the figure, console terminal equipment 65 is provided corresponding to the terminal equipment 15. This equipment 65 and the operation and maintenance apparatus 52 are connected by for example an optical cable. By this, the system can be started up by remote control by an operator.

Finally, a detailed example of the principal parts in the line apparatus 12 of FIG. 5 and a detailed example of the principal parts in the line apparatus 52 of FIG. 15 are shown.

Figure 21:
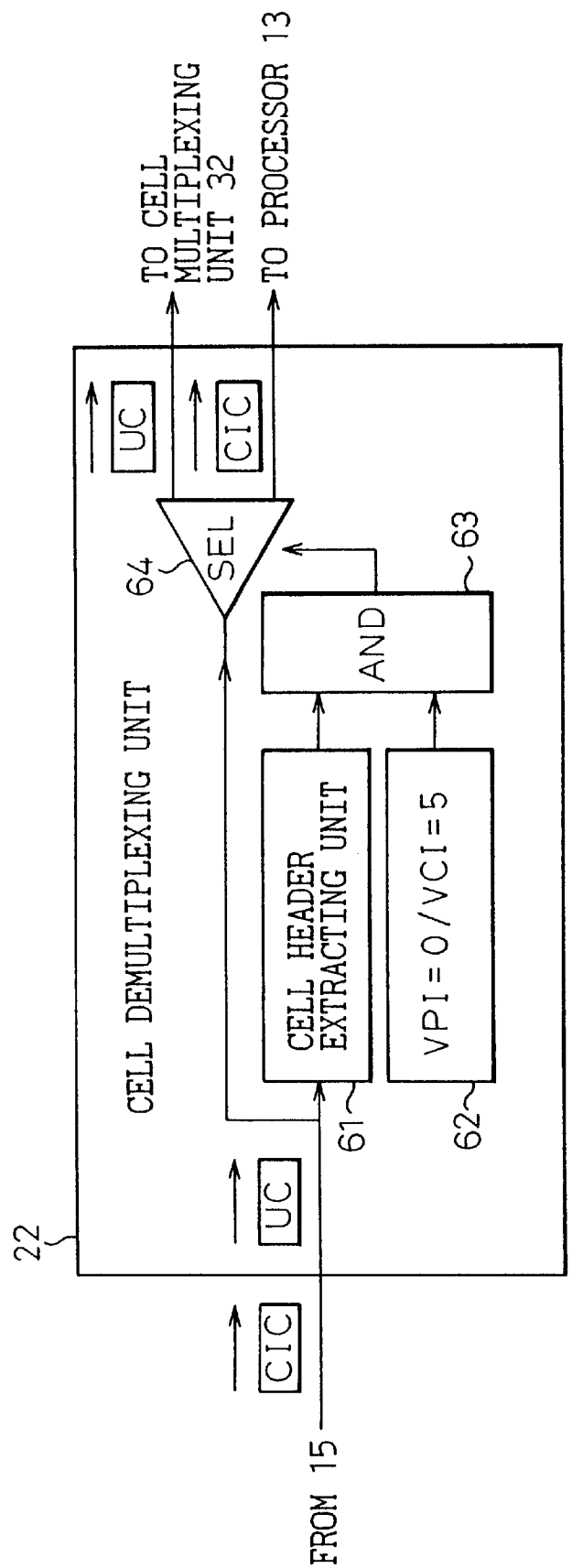
FIG. 21 is a view of a concrete example of a cell demultiplexing unit shown in FIG. 5.

FIG. 21 is a view of a detailed example of the cell demultiplexing unit shown in FIG. 5. Both of the cell demultiplexing units 22 and 23 of FIG. 5 have substantially the same configuration, therefore the former cell demultiplexing unit 22 will be shown.

The cell demultiplexing unit 22 comprises a cell header extracting unit 61, an identification code generation unit 62, an AND gate 63, and a selector (SEL) 64.

The cell demultiplexing unit 22 first discriminates whether the ATM cell assembled in the terminal equipment 15 and sent is a control information cell CIC or a usual user cell UC as already mentioned. For this discrimination, for example the identification code such as VPI=0/VCI=5 is written in the header area shown in FIG. 7. The cell header extracting unit 61 extracts the header area in the received ATM cell. Further, the extracted header area is supplied to one input of the AND gate 63. It is judged at the AND gate 63 whether or not the VPI/VCI value in the header area is VPI=0/VCI=5. An identification code equal to VPI=0/VCI=5 is given to the other input of the AND gate 63 from an identification code generation unit 62.

When it is judged by the AND gate 63 that an ATM cell having VPI=0/VCI=5 is input, the selector 64 is controlled so as to send this ATM cell to the transfer line to the processor 13. This ATM cell is the control information cell CIC.

When it is judged that VPI≠0/VCI≠5 at the AND gate 63, the selector 64 is controlled so as to send this ATM cell to the transfer line to the cell multiplexing unit 32. This ATM cell is a usual user cell UC.

Figure 22:
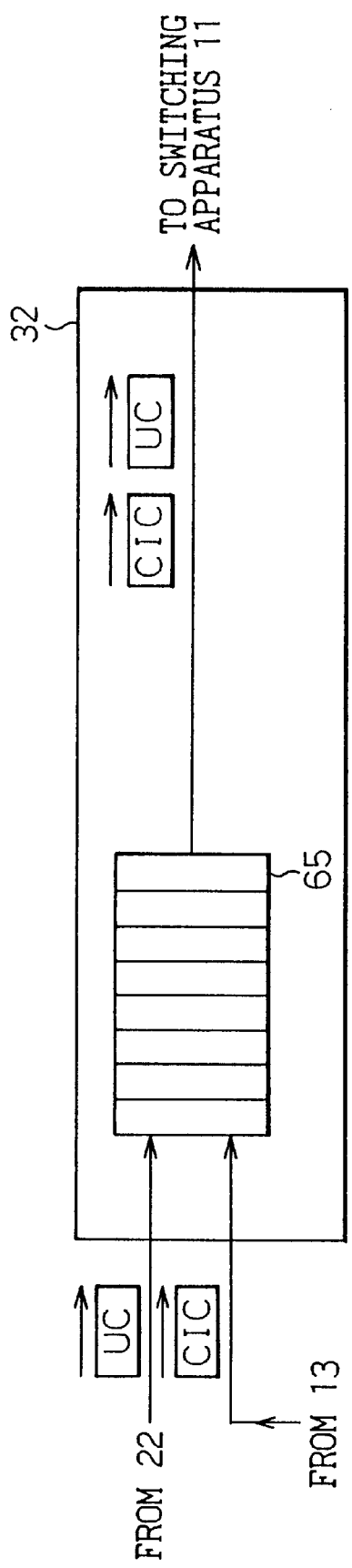
FIG. 22 is a view of a concrete example of a cell multiplexing unit shown in FIG. 5.

FIG. 22 is a view of a detailed example of the cell multiplexing unit shown in FIG. 5. Both of the cell multiplexing units 32 and 33 of FIG. 5 have substantially the same configuration, so the former cell multiplexing unit 32 will be shown.

The cell multiplexing unit 32 can be configured by a simple buffer circuit 65, for example, an FIFO memory.

Figure 23:
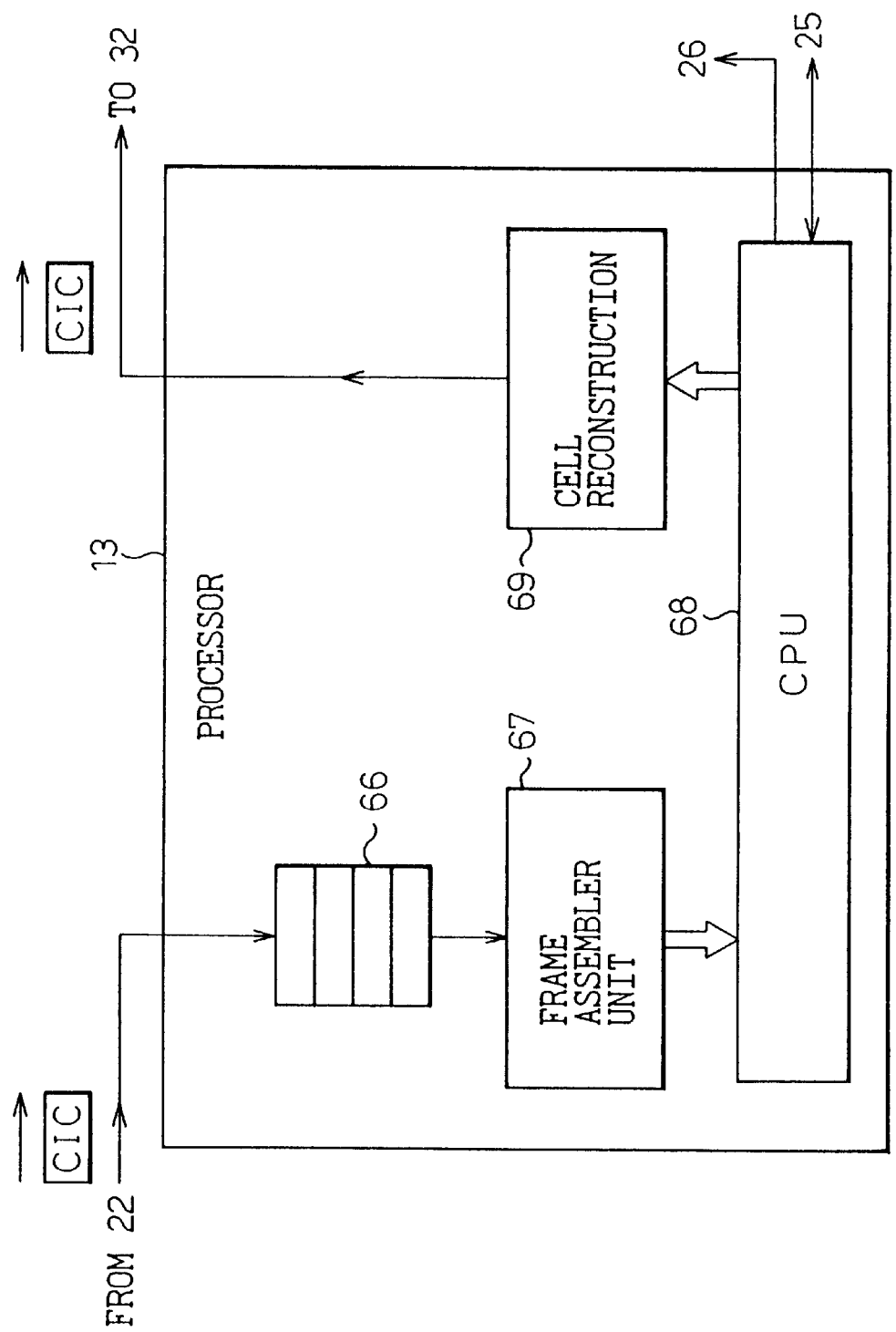
FIG. 23 is a view of an example of an internal configuration of the processor shown in FIG. 5.

FIG. 23 is a view of an example of the internal configuration of the processor shown in FIG. 5. The processor 13 of FIG. 5 pulls therein both of the control information cell CIC of the upstream side going from the terminal equipment 15 toward the switching apparatus 11 and the control information cell CIC of the downstream side going from the switching apparatus 11 toward the terminal equipment 15 and processes them, but only the upstream side is shown in FIG. 23. The downstream side has substantially the same configuration.

The control information cell CIC from the cell demultiplexing unit 22 is first stored once in the cell buffer 66. Then, the stored cell group is assembled into a frame adapted to the processing by the CPU 68. This is done by a frame assembler unit 67.

The frame which has been processed by the CPU 68 is reconstructed into the format of the ATM cell again and sent to the cell multiplexing unit 32. This is done by a cell reconstruction unit 69.

Figure 24:
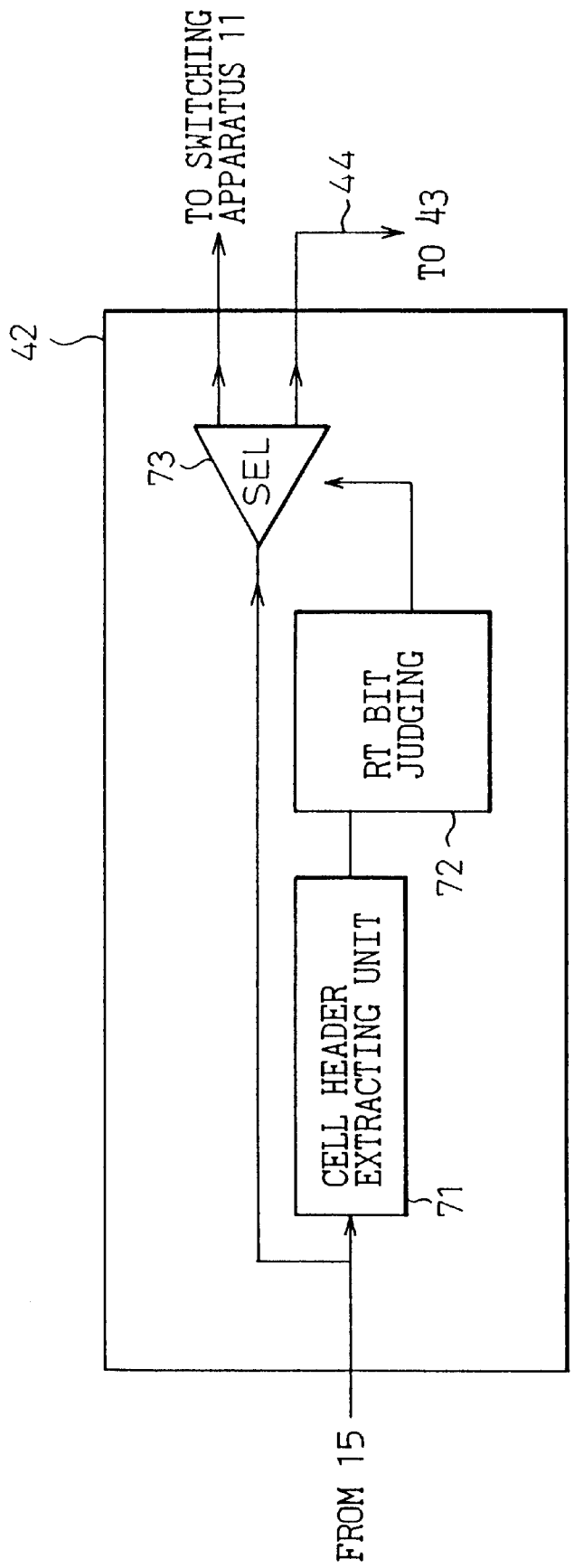
FIG. 24 is a view of an example of the cell return loop unit shown in FIG. 15.

FIG. 24 is a view of an example of the cell return loop unit shown in FIG. 15. Particularly, the example of a cell return judging means 42 in the cell return loop unit 41 of FIG. 15 is shown.

The cell return judging means 42 has a similar configuration as that of the cell demultiplexing unit shown in FIG. 21. The means 42 first extracts the header area of the input ATM cell at the cell header extracting unit 71, further extracts the return indication bit RT in the extracted header area, and supplies the RT to the RT bit judging means 72. The means 72 judges whether the RT bit is "0" (not to be returned) or "1" (to be returned) and controls the selector (SEL) 73 when it is "1" so as to send the input ATM cell to the loop path 44. This ATM cell is the control information cell to be returned in the line apparatus 12.

When the RT bit is "0", the cell is directed to a subscriber belonging to another processor not the same as the processor sending the cell, therefore the cell is input to the switching apparatus 11. Further, the usual routing is carried out so as to transfer the cell to the aimed destination side subscriber.

As explained above, according to the present invention, by introducing a control information cell in addition to the user cell and exchanging this control information cell in the switching apparatus 11, inter-processor communication and inter-subscriber communication among any processors are enabled by simple hardware and control. By utilizing this inter-processor communication, the call processing processor 17 and the BSGC apparatus 16 of the related art shown in FIG. 25 are made unnecessary. Note that the functions realized by these call processing processor 17 and BSGC apparatus 16 are not centralized and dispersed to the plurality of processors 13.

Thus, the high speed bus 18 of the related art becomes unnecessary and the problems due to the existence of this high speed bus 18, that is, (i) the fact that parallel access with respect to a plurality of processors cannot be carried out, (ii) the fact that, when there is parallel access with respect to a plurality of processors, useless waiting time always occurs in the processors other than the first accessed processor, and (iii) the fact that when the ATM exchange is to be enlarged in scale, the high speed bus 18 must also be increased in length along with this, and resulting in a longer operating time, are all solved by the present invention.

Further, since the call processing processor, BSGC apparatus, and high speed bus become unnecessary, the system configuration is simplified and accordingly a less expensive system can be realized.

While the invention has been described with reference to specific embodiments chosen for purposes of illustration, it should be apparent that numerous modifications could be made thereto by those skilled in the art without departing from the basic concept and scope of the invention.

What is claimed is:

1. A multiprocessor type switching system provided with a switching apparatus for performing exchange of cells to be communicated among a plurality of pieces of terminal equipment and with line apparatuses inserted between the switching apparatus and each of said plurality of pieces of terminal equipment, each line apparatus containing a processor, wherein a cell demultiplexing unit for discriminating whether each cell input to each line apparatus is a user cell or a control information cell and separating the same is provided in each said line apparatus, and each said processor performs communication with other processors via said switching apparatus by using said control information cell separated by said cell demultiplexing unit, wherein a cell multiplexing unit for multiplexing said user cell separated by said cell demultiplexing unit and said control information cell sent from said processor is provided in each said line apparatus, and wherein each said cell comprises at least a header area and a payload area, each said control information cell has a specific identification code which enables discrimination from each said user cell in said header area, and a tag area for storing at least tag information designating said processor as a destination is further added to said control information cell sent from said processor, and wherein an indication code for indicating the sender processor of the control information cell is stored in said payload area of said control information cell for asking for a reply from the destination processor of said control information cell in the communication among said processors.

2. A multiprocessor type switching system provided with a switching apparatus for performing exchange of cells to be communicated among a plurality of pieces of terminal equipment and with line apparatuses inserted between the switching apparatus and each of said plurality of pieces of terminal equipment, each line apparatus containing a processor, wherein a cell demultiplexing unit for discriminating whether each cell input to each line apparatus is a user cell or a control information cell and separating the same is provided in each said line apparatus, and each said processor performs communication with other processors via said switching apparatus by using said control information cell separated by said cell demultiplexing unit, and wherein a cell multiplexing unit for multiplexing said user cell separated by said cell demultiplexing unit and said control information cell sent from said processor is provided in each said line apparatus, and wherein each said cell comprises at least a header area and a payload area, each said control information cell has a specific identification code which enables discrimination from each said user cell in said header area, and a tag area for storing at least tag information designating said processor as a destination is further added to said control information cell sent from said processor, and wherein a first broadcast identifier for designating whether or not communication among said processors is to be carried out by a broadcast format is contained in said control information cell sent from said processor.

3. A multiprocessor type switching system as set forth in claim 2, wherein a second broadcast identifier for designating whether or not communication among said processors is to be carried out by broadcast communication with respect to a certain specific processor or to be carried out by broadcast communication with respect to all processors is contained in said control information cell sent from said processor.

4. A multiprocessor type switching system as set forth in claim 2, wherein a reply identifier for designating whether or not the sender processor of broadcast information asks for a reply with respect to the broadcast information from the destination processor in communication among said processors carried out by said broadcast format is contained in said control information cell sent from said processor.

5. A multiprocessor type switching system as set forth in claim 4, wherein a reply indication code for indicating a replying processor is stored in said payload area of said control information cell from said destination processor for which said reply was asked.

6. A multiprocessor type switching system provided with a switching apparatus for performing exchange of cells to be communicated among a plurality of pieces of terminal equipment and with line apparatuses inserted between the switching apparatus and each of said plurality of pieces of terminal equipment, each line apparatus containing a processor, wherein a cell demultiplexing unit for discriminating whether each cell input to each line apparatus is a user cell or a control information cell and separating the same is provided in each said line apparatus, and each said processor performs communication with other processors via said switching apparatus by using said control information cell separated by said cell demultiplexing unit, wherein a cell multiplexing unit for multiplexing said user cell separated by said cell demultiplexing unit and said control information cell sent from said processor is provided in each said line apparatus, and wherein each said cell comprises at least a header area and a payload area, each said control information cell has a specific identification code which enables discrimination from each said user cell in said header area, and a tag area for storing at least tag information designating said processor as a destination is further added to said control information cell sent from said processor, and wherein, when connecting a call between one subscriber on the terminal side and another subscriber on the terminal side, if all of said processors commonly hold the subscriber data and office data, the related call set-up information from the processor to which the originating side subscriber belongs is stored in said payload area of said control information cell and sent to the processor to which the destination side subscriber belongs, response information with respect to the related call set-up information from the processor to which the destination side subscriber belongs is stored in said payload area of said control information cell and returned to the processor to which said originating side subscriber belongs, and thereby the connection of the related call is carried out.

7. A multiprocessor type switching system provided with a switching apparatus for performing exchange of cells to be communicated among a plurality of pieces of terminal equipment and with line apparatuses inserted between the switching apparatus and each of said plurality of pieces of terminal equipment, each line apparatus containing a processor, wherein a cell demultiplexing unit for discriminating whether each cell input to each line apparatus is a user cell or a control information cell and separating the same is provided in each said line apparatus, and each said processor performs communication with other processors via said switching apparatus by using said control information cell separated by said cell demultiplexing unit, wherein a cell multiplexing unit for multiplexing said user cell separated by said cell demultiplexing unit and said control information cell sent from said processor is provided in each said line apparatus, and wherein each said cell comprises at least a header area and a payload area, each said control information cell has a specific identification code which enables discrimination from each said user cell in said header area, and a tag area for storing at least tag information designating said processor as a destination is further added to said control information cell sent from said processor, and wherein, when connecting a call between one subscriber on the terminal side and another subscriber on the terminal side, if all of said processors commonly hold the subscriber data and office data, the related call set-up information from the processor to which the originating side subscriber belongs is stored in said payload area of said control information cell and sent to the processor to which the destination side subscriber belongs, response information with respect to the related call set-up information from the processor to which the destination side subscriber belongs is stored in said payload area of said control information cell and returned to the processor to which said originating side subscriber belongs, and thereby the connection of the related call is carried out.

8. A multiprocessor type switching system as set forth in claim 7, wherein when said control information cell is sent to all processors by broadcast communication and said response information is returned from a plurality of said processors, the connection of the related call is carried out with the processor returning the first response information and, further, a control information cell containing release information is returned to the processors returning the second and following response information.

9. A multiprocessor type switching system provided with a switching apparatus for performing exchange of cells to be communicated among a plurality of pieces of terminal equipment and with line apparatuses inserted between the switching apparatus and each of said plurality of pieces of terminal equipment, each line apparatus containing a processor, wherein a cell demultiplexing unit for discriminating whether each cell input to each line apparatus is a user cell or a control information cell and separating the same is provided in each said line apparatus, and each said processor performs communication with other processors via said switching apparatus by using said control information cell separated by said cell demultiplexing unit, wherein said cell demultiplexing unit comprises a terminal side cell demultiplexing unit receiving a cell from said terminal equipment as its input and a switch side cell demultiplexing unit receiving a cell from said switching apparatus, and wherein a cell return loop unit is provided in each said line apparatus and, when connecting a call between one subscriber on the terminal side and another subscriber on the terminal side, if it is judged that the two subscribers are accommodated by the same processor, the related user cell is not sent to said switching apparatus, but is returned at the cell return loop unit so as to set up the call between the two subscribers.

10. A multiprocessor type switching system provided with a switching apparatus for performing exchange of cells to be communicated among a plurality of pieces of terminal equipment and with line apparatuses inserted between the switching apparatus and each of said plurality of pieces of terminal equipment, each line apparatus containing a processor, wherein a cell demultiplexing unit for discriminating whether each cell input to each line apparatus is a user cell or a control information cell and separating the same is provided in each said line apparatus, and each said processor performs communication with other processors via said switching apparatus by using said control information cell separated by said cell demultiplexing unit, wherein said cell demultiplexing unit comprises a terminal side cell demultiplexing unit receiving a cell from said terminal equipment as its input and a switch side cell demultiplexing unit receiving a cell from said switching apparatus, and wherein one of a plurality of said line apparatuses is an operation and maintenance apparatus which communicates a control information cell for the operation and maintenance of the entire exchange with each processor.

11. A multiprocessor type switching system as set forth in claim 10, wherein when the operation and maintenance information to be placed on said control information cell for transfer is common to all said processors, said operation and maintenance apparatus performs the communication with said processors by broadcast communication so as to distribute the operation and maintenance information to the processors, while when said operation and maintenance information is with respect to a specific one of said processors, it performs the communication with said specific processor by one-to-one communication with the specific processor.

* * * * *